US012602645B2

(12) United States Patent (10) Patent No.: US 12,602,645 B2

Mulholland (45) Date of Patent: Apr. 14, 2026

(54) MOBILE DEVICE APPLICATION AND SYSTEM FOR PROVIDING A VIRTUAL SURVEY

(71) Applicant: William Mulholland, Dorado, PR (US)

(72) Inventor: William Mulholland, Dorado, PR (US)

(73) Assignee: AGOYU LLC, Dorado, PR (US)

( * ) Notice: Subject to any disclaimer, the term of this patent is extended or adjusted under 35 U.S.C. 154(b) by 182 days.

(21) Appl. No.: 17/685,111

(22) Filed: Mar. 2, 2022

(65) Prior Publication Data

US 2022/0300901 A1 Sep. 22, 2022

Related U.S. Application Data

(60) Provisional application No. 63/164,277, filed on Mar. 22, 2021.

(51) Int. Cl.
| | |
|---|---|
| *G06Q 10/0834* | (2023.01) |
| *G06Q 10/0836* | (2023.01) |
| *G06Q 10/087* | (2023.01) |
| *G06V 20/40* | (2022.01) |

(52) U.S. Cl.
CPC ... *G06Q 10/08345* (2013.01); *G06Q 10/0836* (2013.01); *G06Q 10/087* (2013.01); *G06V 20/40* (2022.01)

(58) Field of Classification Search
CPC ......... G06Q 10/08345; G06Q 10/0836; G06Q 10/087
See application file for complete search history.

(56) References Cited

U.S. PATENT DOCUMENTS

| | | | |
|---|---|---|---|
| 10,528,962 B2 | 1/2020 | Rattner et al. | |
| 2004/0122748 A1* | 6/2004 | Donald | G06Q 10/087 |
| | | | 705/28 |
| 2013/0132295 A1 | 5/2013 | Horowitz et al. | |
| 2014/0074744 A1* | 3/2014 | Ben-Harosh | G06Q 10/083 |
| | | | 705/330 |
| 2014/0149306 A1* | 5/2014 | Olsen | G06Q 10/08345 |
| | | | 705/330 |

(Continued)

FOREIGN PATENT DOCUMENTS

| | | | | |
|---|---|---|---|---|
| KR | 20160000007 A | * | 6/2014 | |
| KR | 10-2016-0000007 A | | 1/2016 | |
| WO | WO-0244841 A2 | * | 6/2002 | G06Q 40/04 |

OTHER PUBLICATIONS

Move4U Web Applications, "The SurveyApp" updated on Jan. 15, 2020 (available at: https://play.google.com/store/apps/details?id= com.move4u.surveyapp&hl=en_US) (Year: 2020).*

(Continued)

*Primary Examiner* — Shannon S Campbell
*Assistant Examiner* — Stephanie S. Wallick
(74) *Attorney, Agent, or Firm* — The Marbury Law Group, PLLC

(57) ABSTRACT

A mobile device application and system utilizing artificial intelligence for surveying the contents of a space, estimating a weight of the space contents, locating and providing cost estimates for moving such contents to a given destination. Systems, methods, and devices of the various embodiments may provide an online interface supporting consumer shopping of movers' services and pricing.

17 Claims, 16 Drawing Sheets

(56)         References Cited

U.S. PATENT DOCUMENTS

| | | | |
|---|---|---|---|
| 2014/0344097 A1* | 11/2014 | Horowitz | G06Q 10/08345 |
| | | | 705/26.4 |
| 2015/0139488 A1* | 5/2015 | Dharssi | G06Q 30/02 |
| | | | 382/103 |
| 2016/0055506 A1* | 2/2016 | Tama, Jr. | G06Q 10/08345 |
| | | | 705/7.35 |
| 2016/0292761 A1* | 10/2016 | Saric | G06Q 30/0283 |
| 2017/0323319 A1* | 11/2017 | Rattner | G06N 20/00 |
| 2018/0341910 A1* | 11/2018 | Broveleit | G06Q 10/0833 |
| 2019/0034865 A1* | 1/2019 | Marolli | G06Q 50/40 |
| 2019/0197591 A1* | 6/2019 | Scullion | G06Q 30/0611 |
| 2019/0244267 A1* | 8/2019 | Rattner | G06N 20/00 |

OTHER PUBLICATIONS

International Search Report and Written Opinion of the International Searching Authority for International Patent Application No. PCT/US2022/020371, mailed Jul. 8, 2022, 10 pages.
International Preliminary Report on Patentability received in related International Application No. PCT/US2022/020371 mailed Oct. 5, 2023.

* cited by examiner

200

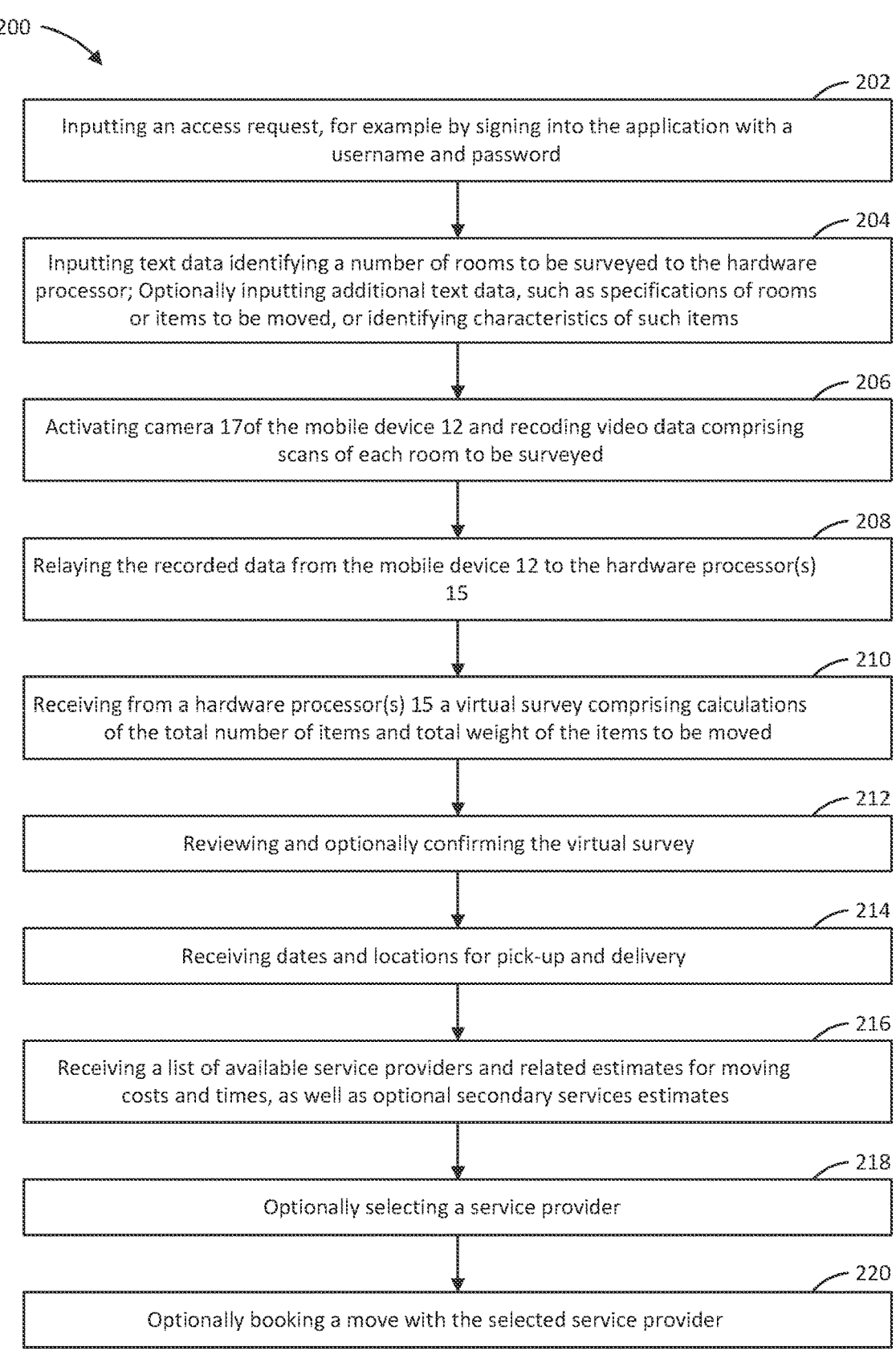

202

Inputting an access request, for example by signing into the application with a username and password

204

Inputting text data identifying a number of rooms to be surveyed to the hardware processor; Optionally inputting additional text data, such as specifications of rooms or items to be moved, or identifying characteristics of such items

206

Activating camera 17of the mobile device 12 and recoding video data comprising scans of each room to be surveyed

208

Relaying the recorded data from the mobile device 12 to the hardware processor(s) 15

210

Receiving from a hardware processor(s) 15 a virtual survey comprising calculations of the total number of items and total weight of the items to be moved

212

Reviewing and optionally confirming the virtual survey

214

Receiving dates and locations for pick-up and delivery

216

Receiving a list of available service providers and related estimates for moving costs and times, as well as optional secondary services estimates

218

Optionally selecting a service provider

220

Optionally booking a move with the selected service provider

FIG. 2

3. Shipment Weight: ?

▦ I know my exact weight    Or    ▦ Calculate my weight    Or    ▭ Virtual survey/Exact Estimate AGOYU    How It Works    Moving Resources    About Us    FAQ ① Compare Movers   ② Packing Services   ③ Third Party Services   ④ Confirm Details   ⑤ Reserve Date & Price with Mover

Third Party Services

Please tell us which services you need help estimate:

| | |
|---|---|
| Basic Appliance and Appliance Service Fees | ⊕ |
| Other Services | ⊕ |
| Beds | ⊕ |
| Electronics | ⊕ |
| Exercise Equipment | ⊕ |
| Grandfather / Wall / Cuckoo Clocks | ⊕ |
| Light Fixtures / Ceiling Fans | ⊕ |
| Playground Equipment and Swings | ⊕ |
| Recreation | ⊕ |
| Piano | ⊕ |
| Flat Screen TV Packing (Armor Pack or Custom Container) | ⊕ |
| Other Services | ⊕ |

Olympia    Olympia Moving and Storage

From
11350 Random Hills Rd, Fairfax, VA 22030, USA
TO
Beverly Hills, CA 90210, USA

| | |
|---|---|
| Date | 03/24/2021 |
| Estimated Weight | 10,000 lbs |
| Estimated Mileage | 2,665 mi |
| Estimated Price | $9,751.12 |
| Estimated Packing Cost | $2,401.35 |
| Estimated Unpacking Cost | $600.25 |
| Total | $11,752.72 |

Third-Party Services:

It seems that you did not select any third-party services. Please select any service that is a part of your move and we'll do the rest Estimated Third Party Fee    $0.00

← Back        Next →

FIG. 8

MAKING MOVES WITH TECHNOLOGY

Dear Bill Mulholland,

CONGRATUALTIONS!

You are almost on your way! Please use the following information when speaking to the Olympia Moving and Storage.

Olympia Moving and Storage

Phone Number: (517) 251-1207
Confirmation Number: #111138
Moving Date: 03/24/2021

Agoyu have only shared your contact information with this moving company. You can expect Olympia Moving and Storage to match out to you in reference to this inquiry in 1-3 business days

Your Move Plan

Customer: Bill Mulholland
Estimated Mileage: 2,853 mi
Weight 10,000 lbs
Estimated Packing Cost: @2,481.35
Estimated Unpacking Cost: $801.25
Estimated Third Party Cost: #20.00
Total: $11,752.72
Consumer Name

Moving Third Party Services

NONE

Moving Address

From
Street Address
11650 Panache Hills Road

Apartment
City
Fairfax
State
VA
Zip
23330
Elevator/Stairs
Single Family House - Single Level To
Street Address Apartment
City
Beverly Hills
State
CA
Zip
90210
Elevator/Stairs
Single Family House - Single Level If you have any questions or as anything find in incorrect, please feel free to email us at support@agoyu.com Please include your confirmation number in the subject li of your email, and we will happy and in any way we care.

FIG. 10

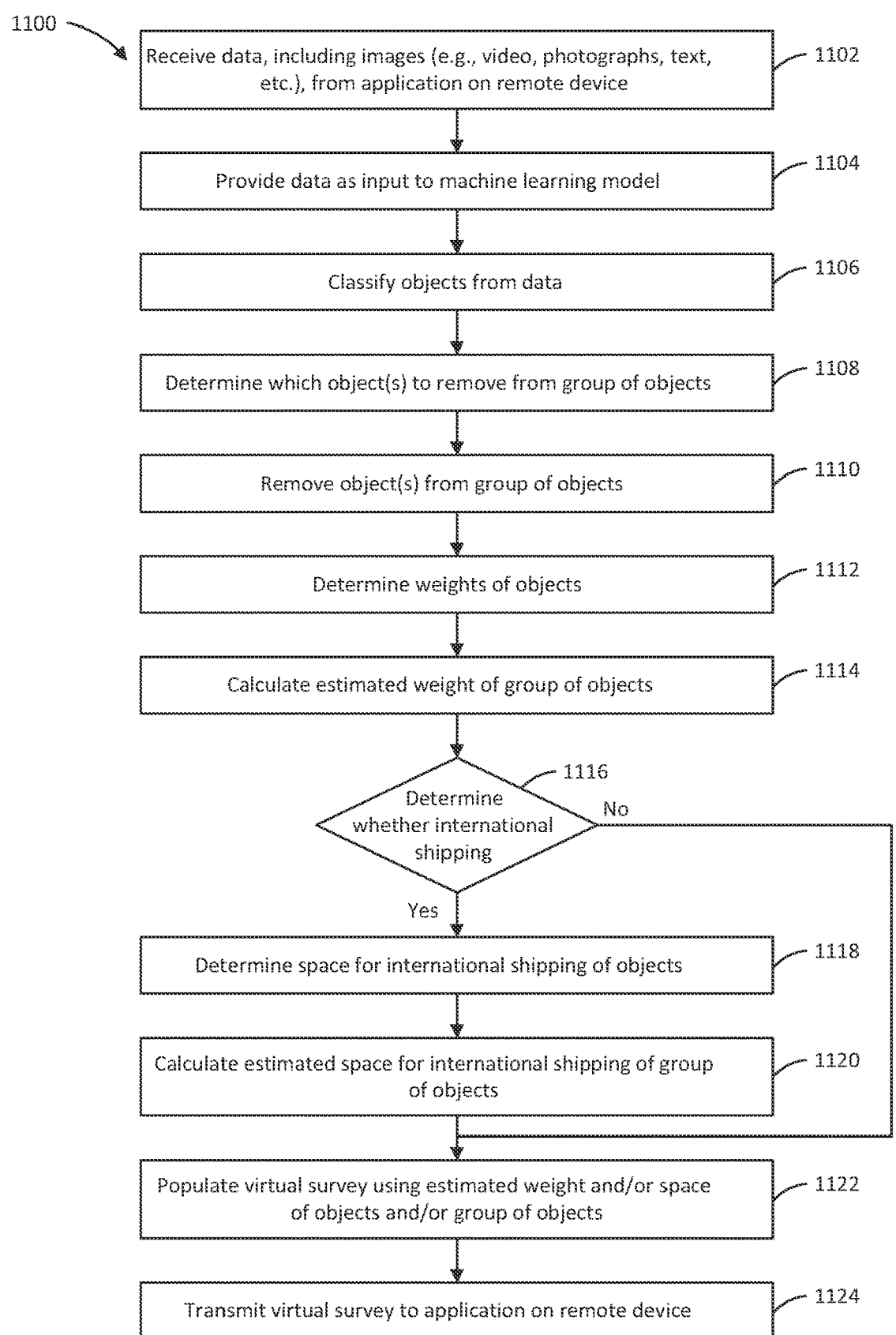

1100

Receive data, including images (e.g., video, photographs, text, etc.), from application on remote device — 1102

Provide data as input to machine learning model — 1104

Classify objects from data — 1106

Determine which object(s) to remove from group of objects — 1108

Remove object(s) from group of objects — 1110

Determine weights of objects — 1112

Calculate estimated weight of group of objects — 1114

Determine whether international shipping — 1116

No

Yes

Determine space for international shipping of objects — 1118

Calculate estimated space for international shipping of group of objects — 1120

Populate virtual survey using estimated weight and/or space of objects and/or group of objects — 1122

Transmit virtual survey to application on remote device — 1124

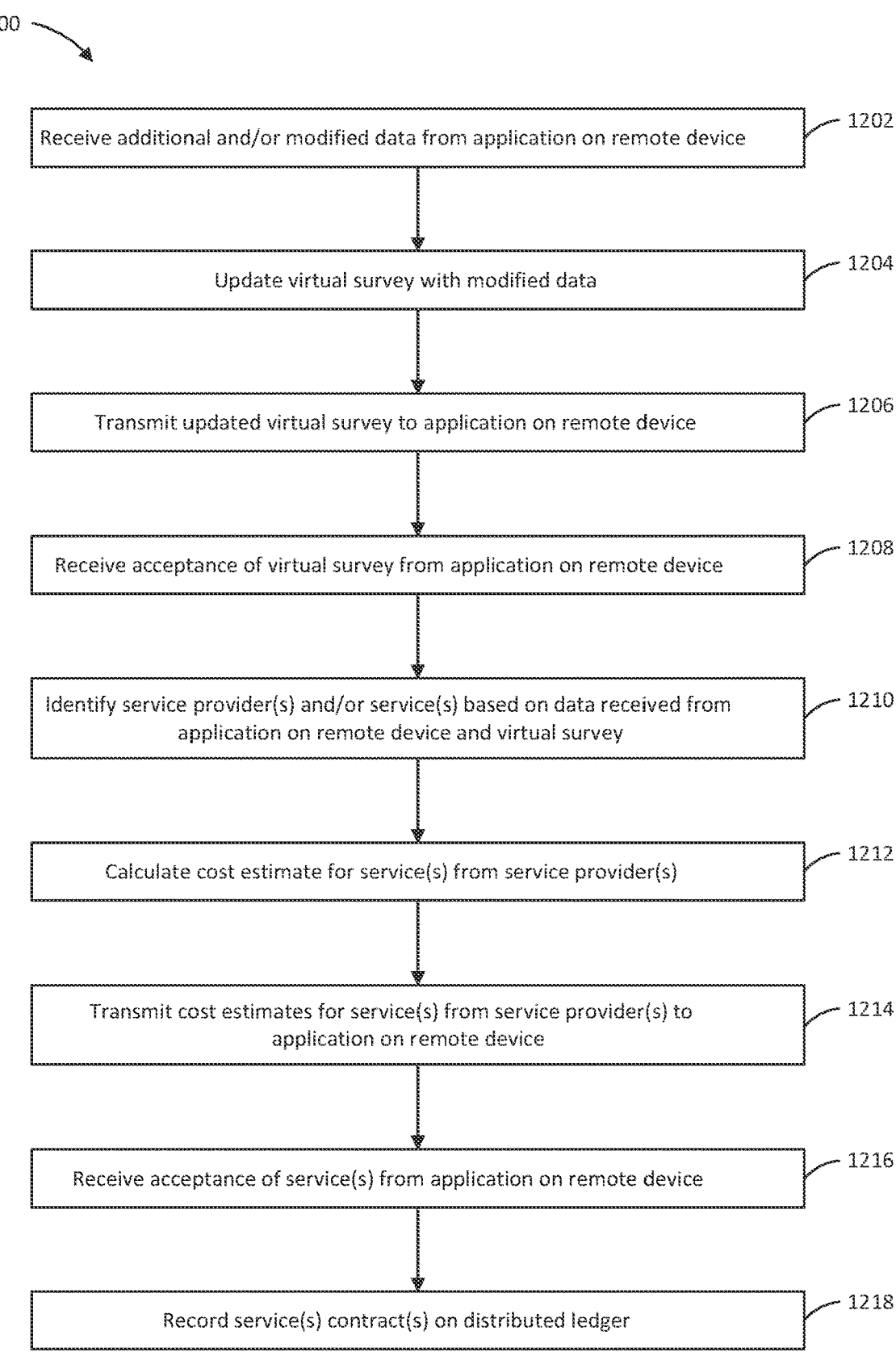

Receive additional and/or modified data from application on remote device — 1202

Update virtual survey with modified data — 1204

Transmit updated virtual survey to application on remote device — 1206

Receive acceptance of virtual survey from application on remote device — 1208

Identify service provider(s) and/or service(s) based on data received from application on remote device and virtual survey — 1210

Calculate cost estimate for service(s) from service provider(s) — 1212

Transmit cost estimates for service(s) from service provider(s) to application on remote device — 1214

Receive acceptance of service(s) from application on remote device — 1216

Record service(s) contract(s) on distributed ledger — 1218

MOBILE DEVICE APPLICATION AND SYSTEM FOR PROVIDING A VIRTUAL SURVEY

RELATED APPLICATIONS

This application claims the benefit of priority to U.S. Provisional Patent Application No. 63/164,277 entitled "Mobile Device Application and System for Providing a Virtual Survey" filed Mar. 22, 2021, the entire contents of which are incorporated herein by reference.

FIELD

Various embodiments may provide a mobile device application and system utilizing artificial intelligence for surveying the contents of a space, estimating a weight of the space contents, and locating and providing cost estimates for moving such contents to a given destination.

SUMMARY

Various embodiments may provide systems, methods, and devices for providing an online interface supporting consumer shopping of movers' services and pricing, including: receiving move parameters for a consumer from a consumer's computing device; estimating moving variables for the consumer; retrieving one or more mover rates for one or more movers; generating an estimate for each mover of the one or more movers based at least in part on the move parameters, moving variables, and one or more mover rates; providing the estimate for each mover to the consumer's computing device; receiving a selection of one of the estimates from the consumer's computing device; and booking a move for the consumer according to the selected one of the estimates. Various embodiments may further include documenting terms of the booked move in a blockchain or other type distributed ledger system. Various embodiments may further include executing the documented terms as a self-executing smart contract from the blockchain or other type distributed ledger system. In various embodiments, the moving variables are one or more of inventory, weight, and/or size. In various embodiments, any of the inventory, weight, and/or size are received via direct entry by the consumer, estimate based on inventory entered by the consumer, estimated based on a box count, and/or artificial intelligence system estimated based at least in part on images (e.g., videos, still images, etc.) taken by the consumer's computing device. In various embodiments, the move parameters may include one or more of an origin, destination, and/or shipment date. In various embodiments, the one or more mover rates for one or more movers are different mover rates for the one or more movers based on whether the move from an origin to a destination is a local move, an interstate move, an intrastate move, or an international move. Various embodiments may further include determining blackout dates and/or discounts for the one or more movers; and applying the blackout dates and/or discounts to the generated estimates provided to the consumer's computing device. Various embodiments may further include providing a mover portal enabling movers to update their respective mover rates, blackout dates, discounts, or other mover attributes. Various embodiments may further include, prior to booking the move: providing an indication of additional services to the consumer's computing device; receiving a selection of one or more of the additional services from the consumer's computing device; and updating the selected one of the estimates to reflect the selected one or more additional services. In various embodiments, the additional services are one or more of packing, unpacking, custom packing, and/or third party services. In various embodiments, the additional services to be provided to the consumer's computing device are determined at least in part by an artificial intelligence engine based on the move parameters and/or moving variables. Various embodiments may further include, prior to booking the move: providing an option to the one or more movers to provide a discount and/or final price in a reverse marketplace. In various embodiments, the selected estimate is a guaranteed and/or not to exceed quote. Various embodiments may further include providing consumer follow-up automatically after booking the move. Various embodiments may further include providing analytics on the move.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate example aspects of the claims, and together with the general description given above and the detailed description given below, serve to explain the features of the claims.

FIG. 2 is a process flow diagram illustrating an embodiment method for generating a moving cost estimate.

FIGS. 3-10 are illustrations of aspects of a user interface of the application for generating a moving cost estimate.

FIG. 11 is a process flow diagram illustrating an embodiment method for generating a moving cost estimate.

FIG. 12 is a process flow diagram illustrating an embodiment method for generating a moving cost estimate.

14 is a process flow diagram illustrating an embodiment method for updating a system for generating a moving cost estimate.

Figure 15:
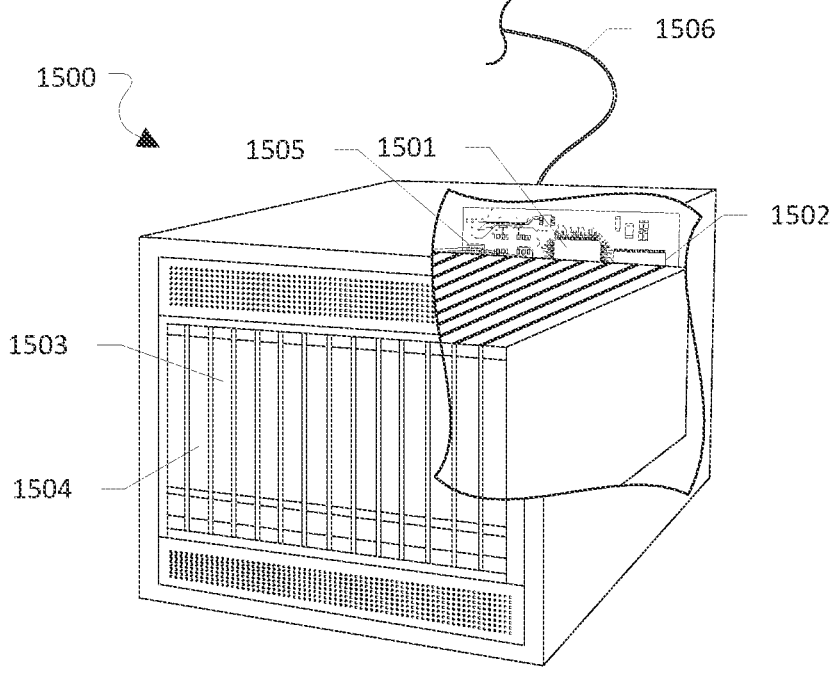

FIG. 15 is a component block diagram of a server that is a computing device suitable for use in the various embodiments.

Figure 16:
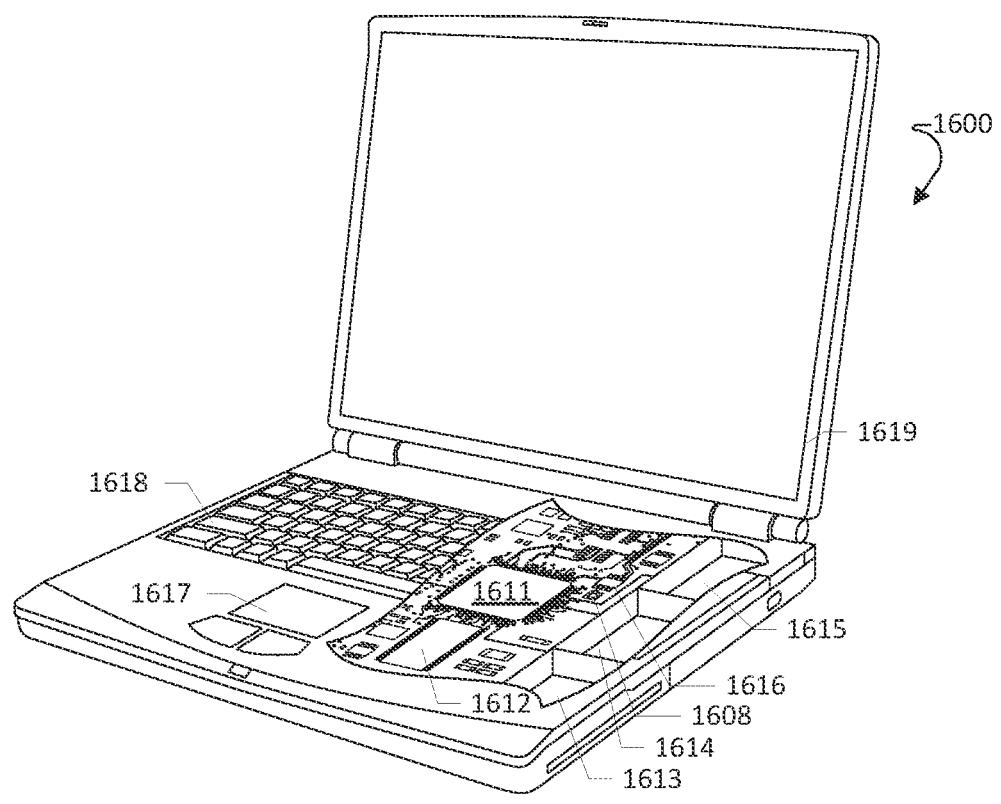

FIG. 16 is a component block diagram of a laptop that is a computing device suitable for use in the various embodiments.

Figure 17:
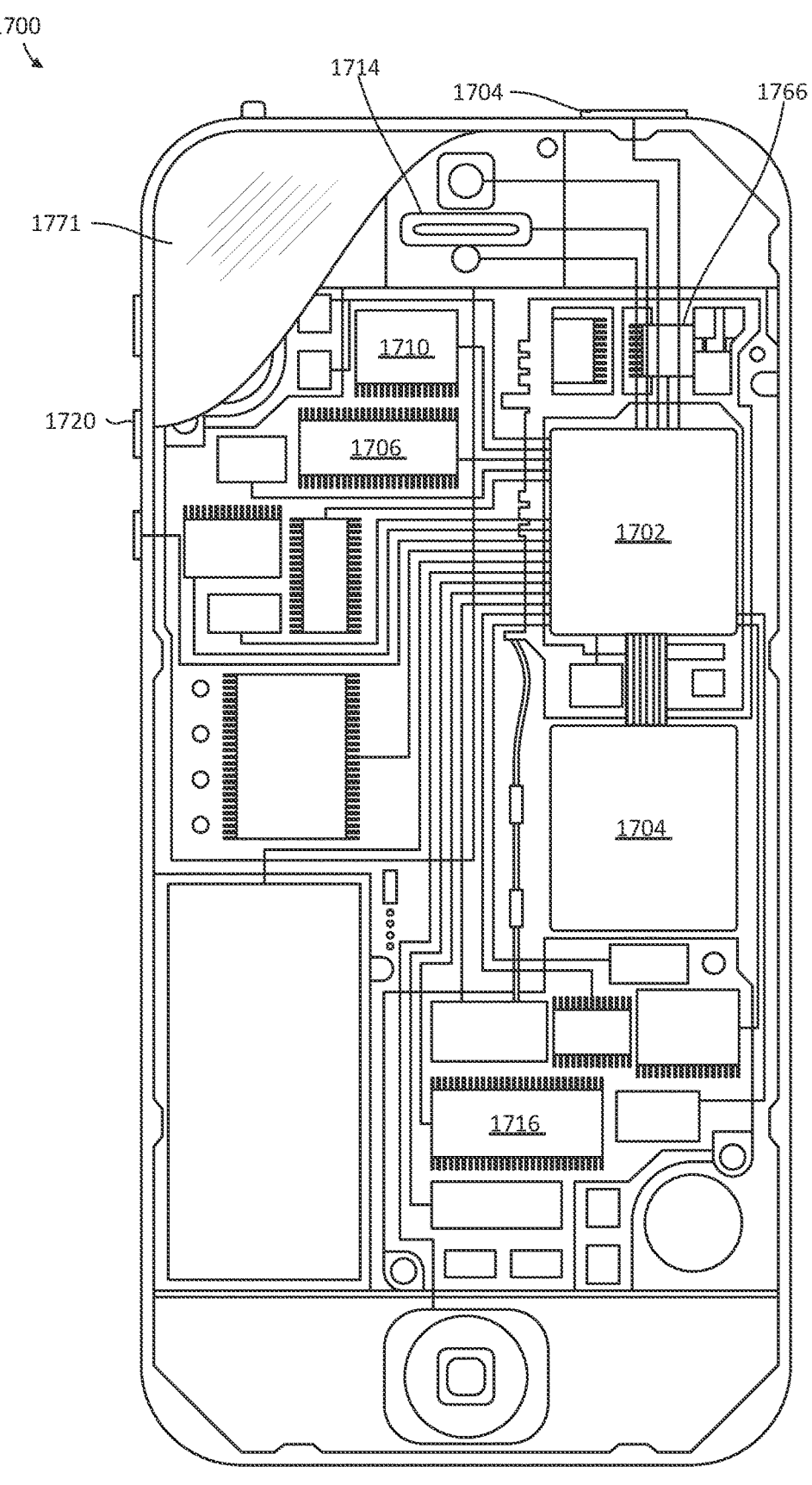

FIG. 17 is a component block diagram of a smartphone that is a computing device suitable for use in the various embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs. Computing devices may include more than one type of processor. For example, a computing device may include a central processing unit (CPU) and a graphics processing unit (GPU).

Shopping for movers is extremely complex, inefficient and time consuming. Moving costs are based on several variables. The most important variables are the shipment, including inventory, weight, and/or size of the shipment. Most consumers do not know the weight of their goods or how much space would be required in a well packed truck, or container to ship their goods. Compiling an exact inventory list of every good they want to ship is complex and time consuming. Further, costs for movers are variable also based on the time of year, the shipment distances, the origin and destination areas, packing and unpacking services, insurance coverage, and/or other "third party" and or "special handling costs" (examples include but are not limited to: shuttling services and or "crating" services).

There is a need for a website available that publishes transparent guaranteed moving costs for consumers to shop. There is a need for a website that publishes mover scores and consumer feedback for consumers to review when shopping. There is a need for a platform that educates the consumer on what information is important to obtain the most accurate pricing and what information is most important to know about the mover and services they select. There is a need for a website that enables consumers to view all of this info while keeping the consumer's contact information private and does not share with any vendor without the consumer's specific consent and request. There is a need for a website that documents all of the terms of a moving service (e.g., price, dates, condition of goods, costs etc.) for both parties to refer back to in the event of a dispute. There is a need for a website that offers the consumer and mover the platform to leave both feedback and the mover's response about the consumer's moving experience.

Further, there are several issues in the moving industry that can negatively impact a consumer. There are many scams or at best "questionable sales tactics" in the moving industry. One example is "buying the move". The mover tells the consumer a very low price to earn the business and the final invoice comes in considerably higher. There is a lack of consumer education. Moving is a complex industry and consumers don't have the expertise to know what questions to ask of a moving company. Moving companies are not transparent or consistent in the way pricing and information is given when "shopping" different movers, in turn making it hard to make an "apples to apples" comparison. Estimates or quotes from movers often times are not "guaranteed/not to exceed" and consumers many times don't know that it's an option to ask for a "guaranteed/not to exceed" quote. There is a need for an unbiased platform to compare mover customer service scores, designations, and/ or affiliations. There is a need for a platform to post reviews and or feedback from consumers. There is a need for a platform to unbiasedly document the agreement between the customer and the mover of the terms of the contract (e.g., dates, inventory, weight, services, price etc.).

Embodiments described herein address the foregoing issues in the moving industry with technology that helps people easily and quickly shop movers' services and pricing online. Embodiments of the technology described herein walk the consumer (e.g., the user) through the process (e.g., at the consumer's own pace) and educate the consumer along the way (e.g., on what info the consumer needs to provide to a mover to get the most accurate price quote). An application on a computing device allows the user (e.g., the consumer) to take video of the goods the user wants to ship. Next, an artificial intelligence (or AI) lists the inventory, the estimated weight and estimated size of all of the items captured in the video. These important details are plugged into a pricing algorithm based at least in part on the prices at which movers have offered their "rates" to calculate the costs of various movers servicing this "lane" (i.e., locations "to and from"). The user is also able to add and/or remove items to reduce and adjust costs based on what the user will or will not ship. Embodiments allow movers to upload rates to a system accessible by a consumer (or user) shopping for a moving company, such that the entire process of shopping for a mover is able to take place with no human contact between the consumer and movers. All contact can be person to computer.

Systems, methods, and devices of various embodiments may provide an online interface supporting consumer shopping of movers' services and pricing.

Various embodiments may include a hardware and software system for a mobile device application utilizing artificial intelligence for surveying the contents of a space, estimating a weight of the space contents, and locating and providing cost estimates for moving such contents to a given destination.

As used herein the term "artificial intelligence" or "AI" may refer to any intelligent computing agent that is configured to perceive an input, autonomously take an action in relation to the input to achieve a goal, and that may improve its performance at achieving the goal. Examples of AI may include Amazon Rekognition®, Google® Vision AI products, or any similar, commercially available product that may be accessed over the Internet. AI may optionally be trained to recognize objects by type and also to estimate dimensions of both objects and rooms. Such training may involve the use of reinforcement-type machine learning based upon the introduction of video, along with optional text data such as estimated room dimensions, into the AI and the vetting and correction of subsequent AI determination output regarding the types and characteristics of objects in the video.

The AI may similarly be trained to estimate volumes, three-dimensional shapes and weights of objects to provide an informational basis for the system to generate a moving cost estimate. Improvement of the AI processing through such training may proceed while the disclosed system is in commercial use.

The system may further include a memory storing a plurality of instructions as well as pre-entered data to include standard weights of various residential and commercial products, such as furniture, fixtures, decorations, etc., as well as data regarding specific companies providing moving services. The application may first be downloaded onto a mobile device that includes a video camera.

In some embodiments, software for a mobile application and related system may create a survey of room, or structure, contents and use the survey to generate one or more moving company price estimates and optionally book a company for a move. A user logs into or signs up for the mobile application, begins a new survey project, records video of the relevant rooms, previews and approves such video, and initiates survey generation by transmitting the video via the application. Upon such transmission, an artificial intelligence engine identifies all items from the recorded video and assigns characteristics to the items, such as weight. If the artificial intelligence fails to identify any items, the failure is communicated to the user for further data input. Upon successful identification, a quantity and weight estimate for all items, along with a list of service providers (e.g., movers) and cost estimates is transmitted to the user via the application, and the user is prompted to input moving information, such as dates and locations, and then to book a service provider.

Figure 1A:
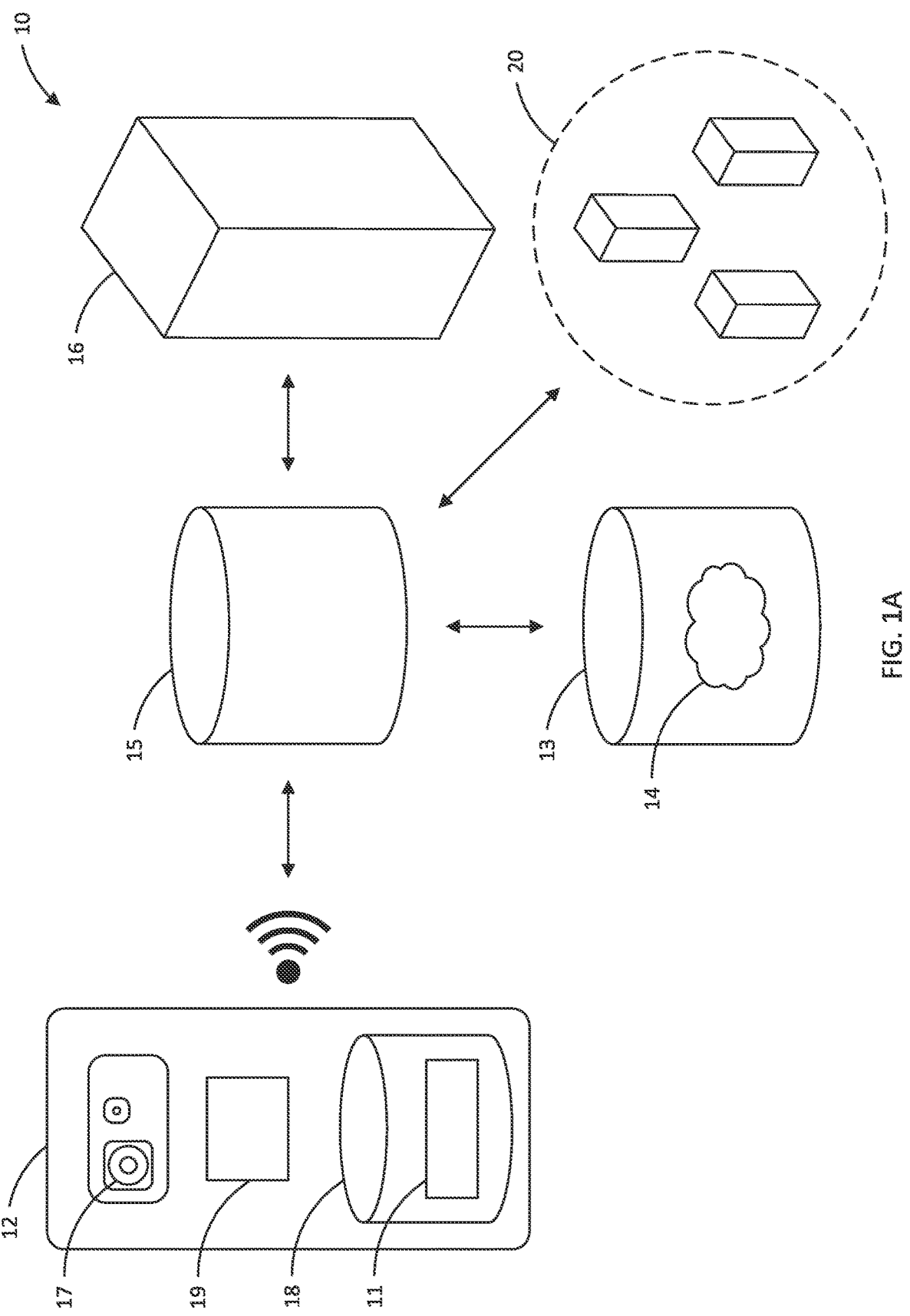
FIG. 1A is a block diagram showing an estimate generating system in accordance with various embodiments.

FIG. 1A is a block diagram showing an estimate generating system 10 in accordance with various embodiments. The estimate generating system 10 may include a mobile computing device 12, such as a cellphone, having a hardware processor(s) 19 (e.g., central processing unit (CPU), graphics processing unit (GPU), etc.) and a memory 18 (e.g., hard drive, solid-state drive, random-access memory, cache memory, etc.) onto which a mobile application 11 has been downloaded. The mobile computing device 12 may include a camera 17. The mobile computing device 12 may communicate via the Internet to a system-specific hardware processor(s) 15 (e.g., central processing unit (CPU), graphics processing unit (GPU), etc.). The hardware processor(s) 15 may communicate to a system-specific memory 13 (e.g., hard drive, solid-state drive, random-access memory, cache memory, etc.) onto which a database 14 has been loaded. As illustrated in FIG. 1A, the hardware processor(s) 15 may also be in communication with an artificial intelligence engine 16, such as commercially available artificial intelligence engine. The artificial intelligence engine 16 may include one or more of hardware processors, memories, and/or artificial intelligence software and/or hardware configured to implement and/or train one of more machine learning models. In the system 10, data may be generated by the mobile application 11, transmitted via the mobile computing device 12 to the processor(s) 15 and thereby to the memory 13 and artificial intelligence engine 16, and then back again. In an alternate embodiment, the memory 13 may be located in a commercially available Internet cloud system. The hardware processor(s) 15 may also be in communication with a network of computing devices implementing a distributed ledger 20, such as a blockchain, etc. Data from the mobile application 11, the memory 13, and artificial intelligence engine 16 may be associated with a smart contract for an agreed to service and recorded in association with the smart contract on the distributed ledger. In some embodiments, the mobile computing device 12 may be a tablet computer and/or a laptop computer. In some embodiments, aspects of the mobile application 11 may be implemented via a website through an Internet browser on the mobile computing device 12 or other computing device, such as a desktop computer.

Figure 1B:
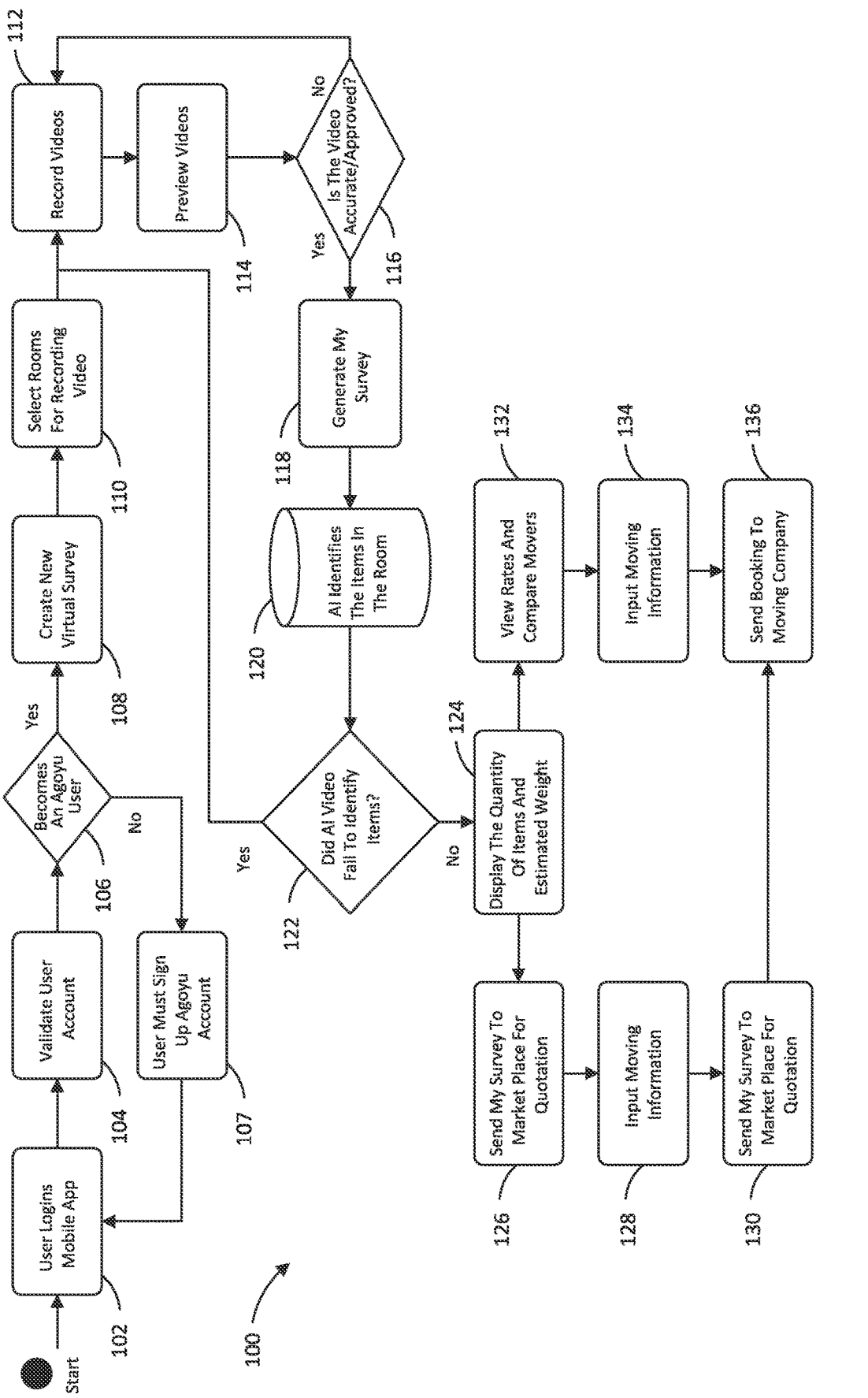
FIG. 1B is a process flow diagram illustrating an embodiment method for creating a survey of room, or structure, contents and using such survey to obtain one or more moving company price estimates, and optionally book a moving company for a move.

FIG. 1B is a process flow diagram illustrating a method 100 for creating a survey of room, or structure, contents and, using such survey, to obtain one or more moving company price estimates and optionally book a moving company for a move. The method 100 may be performed at least in part by a mobile computing device, such as mobile computing device 12, for example by operations of a mobile device application (also referred to herein as "application", "mobile application", and "mobile app") executing at least in part on the mobile computing device to create a survey of room, or structure, contents and, using such survey, to obtain one or more moving company price estimates and optionally book a moving company for a move. With reference to FIGS. 1A and 1B, in some embodiments, the method 100 may be implemented in one or more hardware processors 15, 19, executing software (e.g., application 11) stored on a memory 13, 18.

In block 102, a user may log in to the mobile device application 11 and/or system 10 using a mobile computing device 12. For example, the user may log in using account credentials for the application 11 and/or system 10, for an internet user account, such as a web site, with a company employing the application 11, for another internet enabled account, such as with Google®, Facebook®, etc.

In block 104, the system 10 may validate the user account. The system 10 may employ known account validation means to validate the user account. In some embodiments, the application 11 may validate the user account. In some embodiments, the application 11 may send the user credentials entered into the application 11 via an Internet connection to one or more hardware processors 15, such as a remote server, to validate the user account. Validating the user account may include a determination as to whether the account credentials received in block 102 correspond to an existing user account. The application 11 may generate and/or receive from the one or more hardware processors 15 an indication, such as a signal, a digital value, etc., of whether the user account is valid for the application 11 and/or system 10.

In determination block 106, the system 10 may determine whether the user account is registered for use with the application 11 and/or system 10 and/or whether the user is otherwise an Agoyu user. In some embodiments, the application 11 may interpret the indication of whether the user account is valid for the application 11 and/or system 10 to determine whether the user account is registered for use with the application 11 and/or system 10. In some embodiments, as described above, the user account credentials may be for an Internet user account, for another Internet enabled account, etc. As such, the user credentials may allow access to the application 11 and/or system 10, but the user account may or may not be registered for use with the application 11 and/or system 10. The system 10 may determine, such as via a lookup in a data set, whether the user account is registered for use with the application 11 and/or system 10. In some embodiments, the application 11 may determine whether the whether the user account is registered for use with the application 11 and/or system 10. In some embodiments, the one or more hardware processors 15 may determine whether the user account is registered for use with the application 11 and/or system 10. The application 11 may generate and/or receive from the one or more hardware processors 15 an indication, such as a signal, a digital value, etc., of whether the user account is registered for use with the application 11 and/or system 10.

In response to determining that the user account is not registered for use with the application 11 and/or system 10 (i.e., determination block 106="No"), the application 11 may prompt a user to sign up for a user account with the application 11 and/or system 10 in block 107. Signing up for an account with the application 11 and/or system 10 may include creating a new user account for the application 11 and/or system 10 and/or registering an existing user account with the application 11 and/or system 10. In block 102, the user may log in to the application 11 and/or system 10 using the user account for the application 11 and/or system 10.

In response to determining that the user account is registered for use with the application 11 and/or system 10 (i.e., determination block 106="Yes"), the system 10 may create a new virtual survey in block 108. The system 10 may create the new virtual survey, for example, by associating an instance of a virtual survey with the user account. The virtual survey may provide the user with information relating to services that may be offered to the user through the application 11. Creation of the virtual survey may, for example, cause the application 11 to prompt the user for information and associate the information provided by the user in a data set that may be interpreted as belonging to the instance of the virtual survey associated with the user account. In some embodiments, the application 11 may optionally prompt the user to set parameters for a space to be video recorded, such as a single room or a suite of rooms. Other aspects of the virtual survey may include prompting the user to input proposed pickup and drop-off locations for items to be moved, as well as personal contact information. Alternatively, such information may be input after taking a video(s) as detailed below.

Once initial information has been input by the user, the system 10, via the application 11, may provide filming guidelines for the user to review prior to taking video, of the space to be recorded. In some embodiments, the application 11 may prompt the user to select spaces for recording video, in block 110. In an embodiment, the system 10 provides a default of four rooms, such as one living room, bathroom, bedroom, and kitchen, which can be modified by the user. Once the guidelines are accepted, the application 11 may open the mobile device camera 17, such as a panoramic setting of the mobile device camera 17, for the user to create one or more recorded videos that comprehensively capture each such room and all of the rooms' contents in block 112. In an alternate embodiment, a separate video file is created for each room.

In an embodiment, the user is prompted to input approximate dimensions of each room upon filming. In another embodiment, the user places an object with known dimensions, either identifiable to artificial intelligence engine 16 or with textually input dimensions, into each room before filming. Alternatively, the user may be prompted to move through the room when filming and the mobile application 11 leverages a positioning feature, such as a Global Positioning System (GPS) application, to measure the movement of the user. In each case, the dimensional data gathered may be used by the artificial intelligence engine 16 to create dimensions of the rooms and identified objects both for the generation of packing instructions and the improvement of weight calculation. Such data may also be used for further machine learning and artificial intelligence training.

Upon completion of the video recording, the system 10, via the application 11, may provide the user with the option to preview the video for accuracy and completeness in block 114. In determination block 116, the system 10, via the application 11, may provide the user with options for the user to indicate whether the video is accurate and/or approved, such as whether the video is satisfactory. If the user is unsatisfied with the video (i.e., determination block 116="No"), the user may repeat the video recording process, in block 112, and/or supplement the video with text data for clarification.

Otherwise, if the user is satisfied with the video (i.e., determination block 116="Yes"), the user may be provided a radio button or similar mechanism to signal to the system 10, via the application 11, that the video is satisfactory and that the application 11 may proceed to forward the video and/or text data to one or more hardware processors 15 of the system 10 via the Internet. The one or more hardware processors 15 may then forward the data to a commercially available artificial intelligence engine 16, again via the Internet, which artificial intelligence engine 16 may perform an analysis of the video and/or text data to create a virtual survey of the rooms' contents. Upon accepting the video, the user may optionally be requested to input additional text information, such as general room dimensions, item dimensions or materials, or similar information to aid in more specifically analyzing the items contained therein.

Once the video is accepted, the system 10 may proceed in using the artificial intelligence engine 16 to generate the survey of the recorded space, in block 118, by analyzing each item appearing in the video, first identifying the type of item, optionally estimating the dimensions and/or materials of such item, and thereby estimating the weight of each such item in block 120. The artificial intelligence engine 16 may access information in a database 14 residing on the system's memory 13 as needed via the artificial intelligence engine's 16 connection with the one or more hardware processors 15. The database 14 may include pre-loaded data regarding average weights and other characteristics of various items to enable the artificial intelligence engine 16 to estimate each item's weight, dimensions, etc.

Analysis of the video may lead to the artificial intelligence engine 16 determining whether the video, or items therein, fail for identification in determination block 122. For example, the artificial intelligence engine 16 may determine whether the AI video failed to identify items in determination block 122. For example, the artificial intelligence engine 16 may fail to recognize or classify one or more objects in the video. In some embodiments, failure to identify an object may result in an output by the artificial intelligence engine 16 configured to indicate to the system 10 that a failure occurred.

After analyzing and assigning weights to all items in a given room (e.g., in response to no failure to identify an object(s) (i.e., determination block 122="No")), machine-readable instructions on the one or more hardware processors 15 may then provide the user the survey generated by the artificial intelligence engine 16 to generate a report listing all item weights as well as a total move weight, and transmit such report back to the user via the mobile application 11 The analysis may then be repeated for each additional room until all spaces recorded in the video have been analyzed for estimated weights, at which point the system 10 may generate a full survey including total items and total estimated cargo weight to be moved for the user. The system 10 may provide the survey provided to the user, in block 124, via the application 11.

In the event that, during the artificial intelligence analysis process, a given item or items are misidentified or cannot be accurately identified by the system 10 (e.g., in response to a failure to identify an object (i.e., determination block 122="Yes")), the user may be provided an opportunity to prompt a reanalysis of such items either by recording a video or photo of such items again, in block 112, or by manually amending the identification of the item type.

In an alternate embodiment, the video recording may be supplemented with text descriptions and/or still photographs of specific items, either for aiding identification or the taking of dimensions. The use and submission of audio data may not be required.

In another alternate embodiment, the application 11 may include a step whereby the dimensions of a given item are requested of the user, and the user manually takes and inputs such dimensions, either with the mobile device camera 17 or otherwise.

In an embodiment, the application 11 may prompt the system 10 to access pre-entered information in its memory 13 regarding potential moving companies and their rates in the relevant geographic marketplace. The system 10 may then apply the survey results to that moving company's pre-entered rate and scheduling information to generate informal price and time estimates for purposes of comparison by the user. In an embodiment of the system 10, all data required for the generation of cost estimates from one or more providers may be obtained separately by the system operator and input into the memory 13 for automatic access and application. Thus, the system 10 may generate estimates without the need for direct interaction or communication between the system 10 and any service provider, and thus no service provider interaction module or connection is contemplated. The system 10 may provide the user the estimates in association with the moving companies, in block 132, via the application 11.

In another embodiment, the application 11 may generate a list of potential moving companies and, upon user command, send one or more of the companies the user's survey information with a request for a personal estimate(s) from such company or companies, or a request to verify a system-generated estimate in block 126. In some embodiments, the one or more companies to which the survey is sent may be referred to as a market place.

All estimates generated or obtained through the system 10 may, at the user's option, further include secondary services such as packing, unpacking, storage, and junk removal. In such an embodiment, a user may be prompted to select any such services for which estimates are desired.

As the application 11 provides users a list of available moving companies, other service providers and price estimates to the user, the application 11 may also provide the user with rating or quality information regarding each such company. Such information may draw on information previously gathered and entered into the database 14 dedicated to the application 11, be provided via a link to a third-party rating service, or be an aggregation of such publicly available and/or private rating information.

In an alternate embodiment, upon viewing price and time estimates, the user may have the opportunity to amend the survey by adding or removing items and/or rooms of items in blocks 128 or 134. The amended list for weight recalculation and revised estimates may be resubmitted in block 130.

Once the survey and estimates are complete, the user may be prompted to choose one moving company to use in block 136. In the event that an informal estimate based on the application's own stored information has been used, the application 11 may then automatically contact the chosen company to verify the cost and time estimate.

In an embodiment, the application 11 may have been integrated with each quoted company's scheduling system to provide the user instantaneous real-time scheduling information so that an immediate booking can be made, a deposit paid as needed and confirmation data generated.

Optionally, upon booking, the user may also be provided with options for providing notices to utility companies and other service providers for turn-off, turn-on or other services to be scheduled together with the user's moving dates. For example, should the user choose to stop water service at his old house on the move-out date, the system 10 would electronically forward such notice to the relevant water company on the user's behalf.

FIG. 2 is process flow diagram illustrating an embodiment method 200 to be followed in operating a mobile application 11 on a mobile computing device 12 for generating a moving cost estimate. With reference to FIGS. 1A-2, in some embodiments, the operations of method 200 may be implemented in one or more hardware processors 19, executing software (e.g., application 11) stored on a memory 18.

Operations of method 200 may include inputting an access request, for example by signing in to the application 11 with a username and password in block 202. Inputting an access request in block 202 may include logging in to the application 11 and/or system 10 using a mobile computing device 12. For example, the user may log in using account credentials for the application 11 and/or system 10, for an internet user account, such as a website, with a company employing the application 11, for another internet enabled account, such as with Google®, Facebook®, etc. Whichever login means is employed, the account of the login credentials may be for the application 11 and/or system 10 and/or for a user account registered with the application 11 and/or system 10.

Operations of method 200 may include inputting text data identifying a number of rooms to be surveyed to the hardware processor(s) 15 in block 204. In one embodiment of the method 200, the inputting of text data is completely or partially done in reply to prompts generated by the application 11. Optionally, in block 204, the method 200 may include inputting additional text data, such as specifications of rooms or items to be moved, or identifying characteristics of such items in block 204.

Inputting text data identifying a number of rooms to be surveyed to the hardware processor(s) 15 in block 204 may include inputting data of a count of spaces having objects for inclusion in an inventory list for a move through the application 11. In some embodiments, inputting text data may include inputting the text data into a text field element of the application 11. In some embodiments, inputting text data may include selecting an option of text data inputs, such as selecting a number from a dropdown men element, a scroll menu element, etc. of the application 11.

Optionally inputting additional text data, such as specifications of rooms or items to be moved, or identifying characteristics of such items in block 204 may include inputting data identifiers to be associated with the spaces and/or the objects to be included in the inventory list through the application 11. For example, the additional text data may include one or more of a name or type identifier for a type of space, an approximate size of the space, etc. For another example, the additional text data may include one or more of a name or type identifier for an object to be included in the inventory list, an approximate or exact size of the object, an approximate or exact weight of the object, a name or type identifier for a space in which the object may belong, a number of instances of the object, a description of the object (e.g., fragile, antique, description of the condition of the object, such as any prior damage, etc.), etc. In some embodiments, inputting text data may include inputting the text data into a text field element of the application 11. In some embodiments, inputting text data may include selecting an option of text data inputs, such as selecting from a dropdown men element, a scroll menu element, etc. of the application 11.

Operations of method 200 may include activating the camera 17 of the mobile computing device 12 and recording video data including scans of each room to be surveyed in block 206. Activating the camera 17 of the mobile computing device 12 and recording video data including scans of each room to be surveyed in block 206 may include manual and/or automatic activation of the camera 17 through the application 11. The application 11 may provide the user with an option or a prompt to activate the camera 17 at the convenience of the user. The application 11 may provide the user with an interactive element, such as a button (e.g., a touch element on a touch screen (not shown) of the mobile computing device 12, or a physical button of the mobile computing device 12) to activate the camera 17. In some embodiments, the application may provide the user with a notification that the camera 17 will activate and then automatically activate the camera 17. The application may provide the user with guides for videoing a space and the objects within the space before and/or after activating the camera 17. For example, such guides may include notes on lighting (e.g., general notes on lighting and/or notes in response to lighting conditions detected while videoing, such as "low light", etc.). For another example, such guides may include notes on positioning of the camera 17 (e.g., where to place the camera in the space, angle from which to video objects, etc.). For another example, such guides may include notes on moving the camera 17 (e.g., a speed at which to pan the video in the space, etc.).

Operations of method 200 may include relaying the recorded video data from the mobile computing device 12 to the hardware processor(s) 15 in block 208. Relaying the recorded video data from the mobile computing device 12 to the hardware processor(s) 15 in block 208 may include uploading one or more completed videos via an internet connection via the application 11. For example, a video may be relayed upon completion of the video (i.e., when the camera 17 is deactivated). For another example, the video may be relayed upon approval of the user. In some embodiments, the user may review the video and approve the video for upload prior to the video being relayed. In some embodiments, the user may add notes to the video, such as a name or type description of the space, an approximate size of the space, etc. Adding notes to the video may include inputting text data into a text field element of the application 11. Adding notes to the video may include selecting an option of text data inputs, such as selecting from a dropdown men element, a scroll menu element, etc. of the application 11.

Operations of method 200 may include receiving from a hardware processor(s) 15 a virtual survey including calculations of the total number of items and total weight of the items to be moved in block 210. Receiving from a hardware processor(s) 15 a virtual survey including calculations of the total number of items and total weight of the items to be moved in block 210 may include information generated by the artificial intelligence engine 16 from analysis of one or more relayed videos. The information may be in various formats, such as an inventory list of items indicating a weight, size, and/or number of instances of each item per space and/or per video, an inventory list of items indicating a weight, size, and/or number of instances of each item of all spaces and/or videos, a per space and/or per video calculation of a sum of the weight, size, and/or number of instances of each item, and/or a total calculation of a sum of the weight, size, and/or number of instances of each item of all spaces and/or videos. The information may further include names or type identifiers for the objects, names or type identifiers of spaces in which the object may belong, descriptions of the object (e.g., fragile, antique, description of the condition of the object, such as any prior damage, etc.), etc.

Operations of method 200 may include reviewing and optionally confirming the virtual survey in block 212. Reviewing and optionally confirming the virtual survey in block 212 may include the application 11 displaying the virtual survey, or inventory list of items, and providing the user with a means of confirming the virtual survey, such as a confirmation button. In some embodiments, the application 11 may enable the user to modify the virtual survey prior to confirming the virtual survey. For example, the application 11 may enable the user to correct information in the virtual survey, add information to the virtual survey, and/or delete information from the virtual survey as described further herein, for example, with reference to FIGS. 4A-5B.

Operations of method 200 may include receiving dates and locations for pick-up and delivery in block 214. Receiving dates and locations for pick-up and delivery in block 214 may include the user providing the application 11 with the dates and locations, such as via entering the information using interactive elements of the application 11. For example, the user may input exact, preferred, and/or flexible dates for services related to moving the items of the virtual survey. For another example, the user may input exact locations for services related to moving the items of the virtual survey. The application 11 may provide the user with interactive elements, such as text input elements, menu elements, etc., for inputting the dates and locations for services related to moving the items of the virtual survey.

Operations of method 200 may include receiving a list of available service providers and related estimates for moving costs and times, as well as optional secondary services estimates in block 216. Receiving a list of available service providers and related estimates for moving costs and times, as well as optional secondary services estimates in block 216 may include the application 11 receiving this information from the system 10. The information may be generated by the system 10 based on service provider availability schedules, generic and/or service provider specific pricing variables, and/or generic and/or identified by the artificial intelligence engine 16 secondary services related to moving the items of the inventory list (e.g., additional services offered by a service provider and/or third party service provider). Such secondary services may include, for example, standard full and/or partial packing and/or unpacking, and/or special packing and/or unpacking for specific items. Other secondary services may include insurance policies, vehicle shipping, utilities management, etc. Examples of a list of available service providers and related estimates for moving costs and times, as well as optional secondary services estimates are illustrated in and described with reference to FIGS. 6-8.

Operations of method 200 may include optionally selecting a service provider in block 218. Optionally selecting a service provider in block 218 may include the user interacting with an interactive element of the application 11 to select the service provide and transmit an indication of the selection from the application 11 to the system 10 via the internet connection. For example, the application 11 may provide the user with an interactive element, such as a button and/or radio button, etc. for making a selection of a service provider. In some embodiments, the application 11 may prompt the user to confirm the selection prior to the application 11 transmitting the indication of the selection from the application to the system 10. An example of a display from which the user may select a service provider through the application 11 is illustrated in and described with reference to FIG. 6.

Operations of method 200 may include optionally booking a move with the selected service provider in block 220. Optionally booking a move with the selected service provider in block 220 may include contracting for service with the selected service provider through the application 11. For example, the user may confirm selections of the service provider and/or services through interaction with an interactive element, such as a by providing a payment method through a combination of interactive elements, and/or confirming the selected service provider and/or services, and/or information relating to the selected service provider and/or services (e.g., time, location, cost, etc.). The application 11 may provide the user with displays for and/or of a booking of services. Examples, of the displays are illustrated in and described with reference to FIGS. 9 and 10. In some embodiments, the booking information may be recoded and/or implemented in a smart contract by the distributed ledger 20.

In some embodiments, following receiving a list of available service providers and related estimates for moving costs and times, as well as optional secondary services estimates in block 216, the user may request one or more the service providers to submit a discount and/or a "best and final offer" via the application 11. The request may trigger the system 10 to send an email to the one or more service providers with the request and information relating to moving the items of the inventory, such as the locations for rendering service, the video of the objects, the inventory list, the estimated weight/size, and/or selected third party services. The service provider may enter a discount and/or "best and final offer" into the system 10, and the system 10 may update the user through the application 11. In some embodiments, the service provider may be required to ensure that the cost for services quoted with the discount and/or "best and final offer" will not increase (e.g., "bound not to exceed").

In some embodiments, following receiving a list of available service providers and related estimates for moving costs and times, as well as optional secondary services estimates in block 216, the user may request one or more the service providers to submit a discount and/or a "best and final offer" via the application 11. The request may trigger the system 10 to send an email to the one or more service providers with the request and information relating to moving the items of the inventory, such as the locations for rendering service, the video of the objects, the inventory list, the estimated weight/size, and/or selected third party services. The service provider may enter a discount and/or "best and final offer" into the system 10, and the system 10 may update the user through the application 11. In some embodiments, the service provider may be required to ensure that the cost for services quoted with the discount and/or "best and final offer" will not increase (e.g., "bound not to exceed").

In some embodiments, the system 10 may be configured provide follow up with the consumer throughout the process providing tips, industry best practices and resources at certain milestones via the application 11. For examples, a day after move is booked the customer may receive an email reminding them about a "bound" estimate and the importance of knowing if the estimate from the mover is a "bound not to exceed". For another example, two days after move is booked the customer may receive an email reminding them about "delivery windows" and to ensure through their mover if they have an exact date or a "delivery window". For another example, on a day of a move the customer may receive an email reminding them about the claims process and highlighting any requirements (in the event any goods are damaged during shipment). On average people move every seven years. As such the consumer is not aware of best practices. The system 10 and/or application 11 may be programmed with automated emails that are set to go out throughout the process at milestone events, so the customer receives support real time.

FIGS. 3-10 are illustrations of aspects of a user interface of the application 11 for generating a moving cost estimate. With reference to FIGS. 1A-10, the mobile computing device 12, including the one or more hardware processors 19, may execute the application 11 and render the aspects of the user interface, illustrated in FIGS. 3-10 and described herein, on a screen of the mobile computing device 12. A user of the mobile computing device 12 may interact with the application 11 via the user interface, for example, by interacting with a touch screen of the mobile computing device 12 and/or a peripheral device (not shown, e.g., a mouse, keyboard, etc.) connected to the mobile computing device 12. The aspects if the user interface illustrated in FIGS. 3-10 and described herein are examples of such aspects, and do not limit the scope of the claims or the description. One of skill in the art will understand that the aspects of the user interface illustrated in FIGS. 3-10 may be differently configured to enable the same functions.

Figure 3:
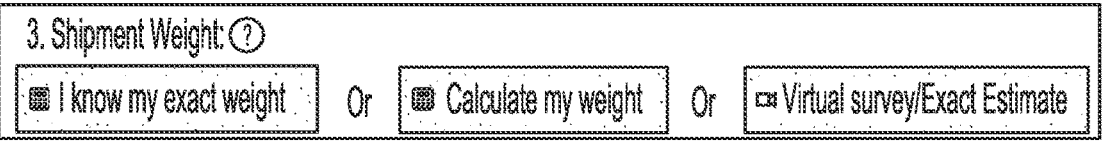

The application 11 may assists the consumer in determining the base cost of a move (known in the industry as the "line haul"). The line haul cost may be determined by using a pricing algorithm that uses: 1) the weight; 2) the inventory; 3) the size; 4) the origin and destination; 5) the shipment date; 6) the mover's offered "base rate"; and/or 7) any subsequent mover discounts to calculate the price. FIG. 3 illustrates an example of how the application 11 enables the consumer to determine the weight for booking the move. The application 11 may provide the consumer with a number of options for entering and/or determining the weight. For example, the options may include the consumer to enter the shipment weight and/or shipment inventory (calculating an estimated size if needed) ("I know my exact weight" in FIG. 3).

For another example, the options may include the consumer calculating the weight ("Calculate my weight" in FIG. 3) by manually entering information in to the application 11 and leveraging capabilities of the application 11 and/or the system 10 to calculate the weight. In some embodiments, calculating the weight may include using an estimation tool of the application 11 and/or the system 10, which may the user a room count of the space and if they have an average, moderate or overly furnished space. The consumer may specify rooms (e.g., bedrooms, bathrooms and other rooms) and the system 10 may create an estimated shipment weight and an average inventory (and size if applicable). In some embodiments, calculating the weight may include using an estimation tool of the application 11 and/or the system 10, which may provide the user an option to select every item to be shipped and compile average box counts (for self-pack options). The application 11 and/or system 10 may compile a list of goods and calculates average box counts based on average dimensions. This information may be plugged into the system 10 to return exact shipping costs.

For another example, the options may include the application 11 and/or system 10 calculating the weight ("Virtual Survey/Exact Estimate" in FIG. 3) based on a user taking video of their shipment using the application 11. The artificial intelligence engine 16 analyzes the video and in turn creates an exact inventory list from the items video and an estimated weight of each item. The consumer may be able to adjust the inventory and add or remove goods to create an exact inventory list and accurately estimated weight. This or similar examples may be incorporated for implementation of block 124 described for the method 100 with reference to FIG. 1B, and blocks 204-212 described for the steps of method 200 with reference to FIG. 2.

Figure 4A:
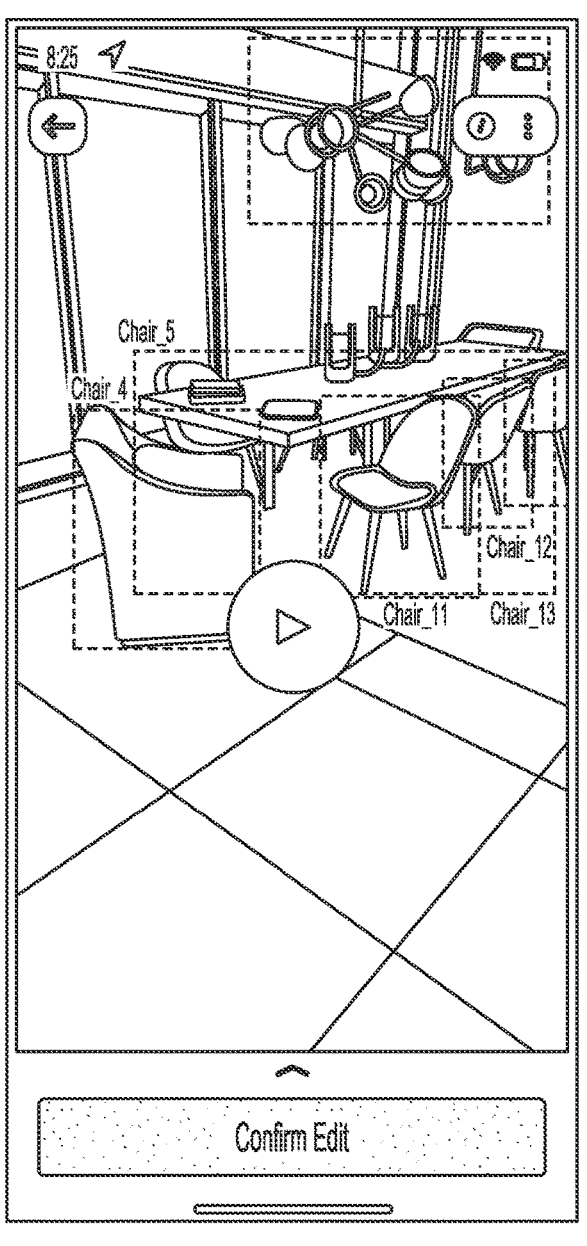
Figure 4B:
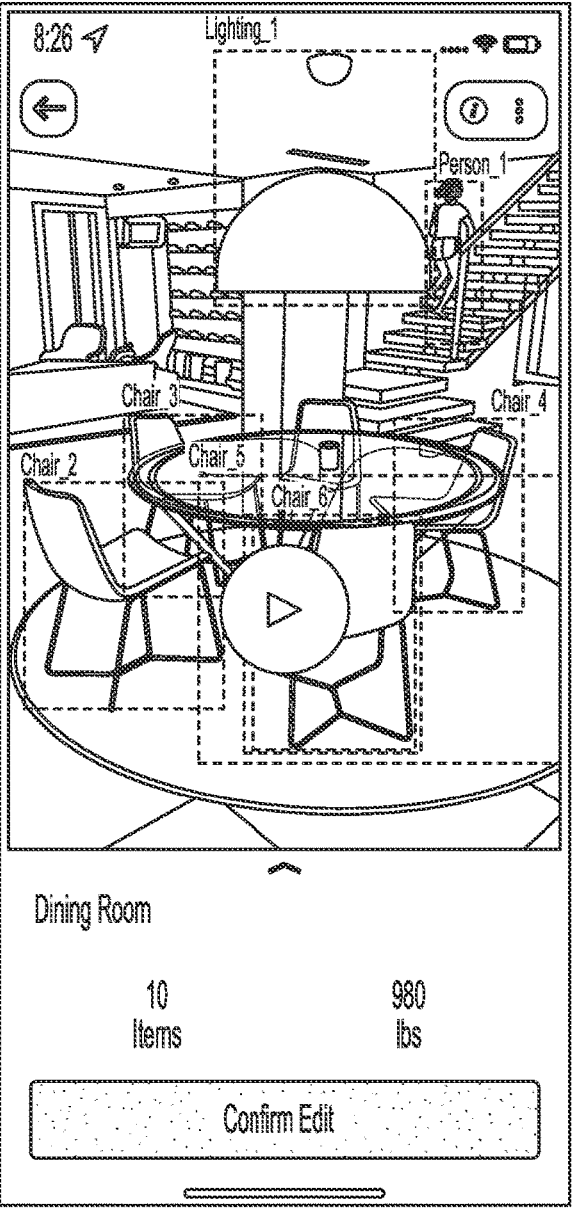

FIGS. 4A, 4B, 5A, and 5B illustrate examples of how the application 11 enables the consumer to review and/or adjust the inventory generated by the artificial intelligence engine 16 from analysis of the video of the shipment taken by the user using the application 11. These or similar examples may be incorporated for implementation of block 124 described for the method 100 with reference to FIG. 1B, and blocks 210 and 212 described for the steps of method 200 with reference to FIG. 2. As described herein, the system 10 may return the inventory generated by the artificial intelligence engine 16 to the application 11 for review, adjustment, and/or confirmation by the user. In various embodiments, the system 10 may return the inventory generated by the artificial intelligence engine 16 to the application 11 in one or more formats. For example, the system 10 may return the video taken using the application 11 back to the application 11 with markers added by the artificial intelligence engine 16 indicating the objects in the video identified by the artificial intelligence engine 16, as illustrated in FIGS. 4A and 4B.

In some embodiments, the markers may include one or more visual indications of an identification of an object in the video, such as a boundary around the object, an overlay over the object, a label adjacent to the object, etc. In some embodiments, the application 11 may enable the user to view the video with the markers. The user may view the video to confirm whether all of the objects and/or whether only the intended objects are identified by the artificial intelligence engine 16. In some embodiments, the application 11 may enable the user to adjust the identifications of objects in the video through the application 11. For example, the markers may be interactive elements that the application 11 may enable the user to modify, add, and/or remove the markers. Modifying a marker may include changing a label of the object. The label may be configured to indicate an object and/or a classification of the object. Modifying the label may include changing whether the label indicates the object (e.g., changing the label so that the identified object is not indicated as an object for the purposes of the inventory), and/or changing a classification of the object (e.g., correcting the classification for a misclassified object). Adding a marker may include adding a marker for an object not identified in the video by the artificial intelligence engine 16 (e.g., for an object that is at least partially obscured). Adding the maker may include adding a classification of the object to identify to the system 10 what type of object is being added so that the system may update weight, cost, and/or space for the inventory. Removing a marker may include deleting a marker for an object that is incorrectly identified as an object and/or that the user does not want to include in the inventory. Removing the maker may include deleting the marker and/or changing a classification of the object associated with the marker to indicate not to include the object in the inventory. In some embodiment, some inventory information (e.g., space identifier, number of items in a space, and/or weight of items in the space) may be displayed along with the video, as illustrated, for example, in FIG. 4B. In some embodiments, the application 11 may enable the user to submit edits to the inventory, such as by editing the markers, to the system 10 for updating the inventory.

Figure 5A:
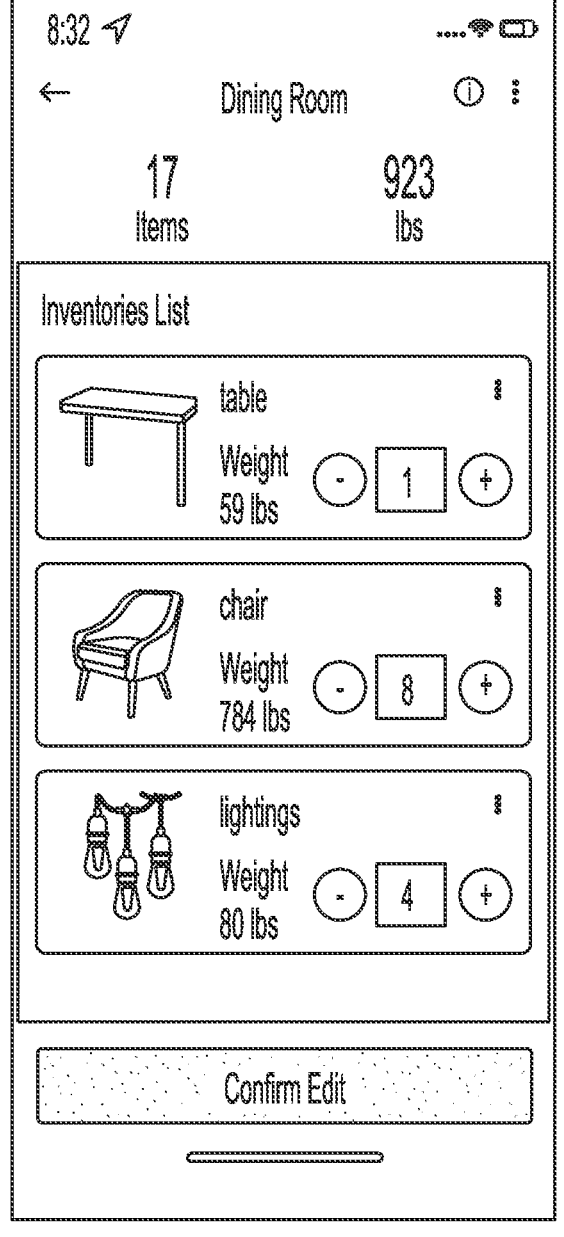
Figure 5B:
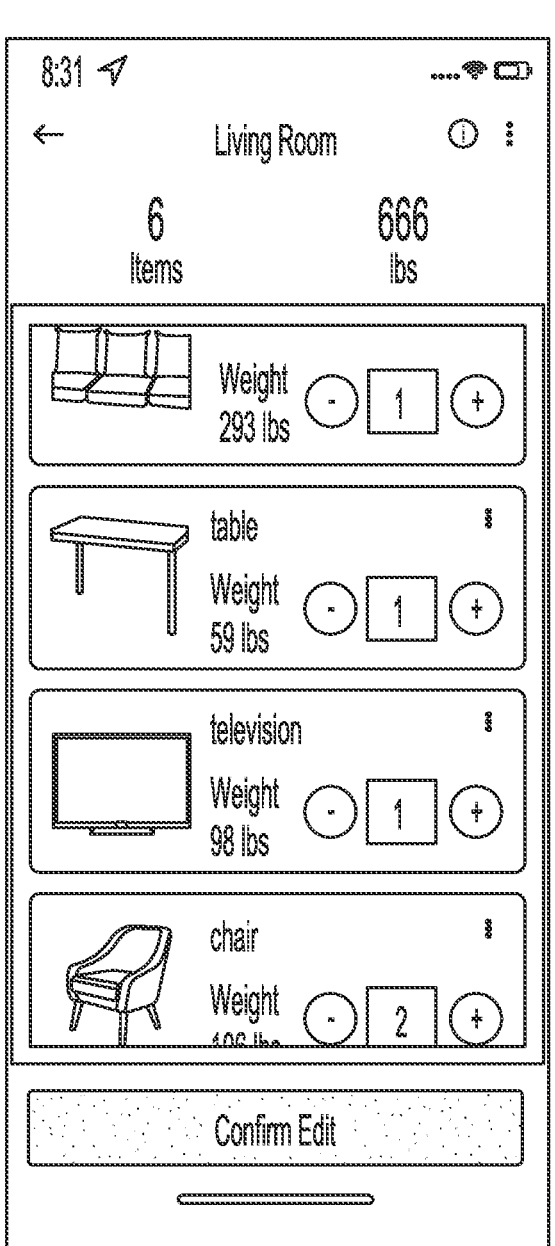

For another example, the system 10 may return an inventory list of the objects in the video identified by the artificial intelligence engine 16, as illustrated in FIGS. 5A and 5B. The inventory list may include one or more indications of an identification of an object in the video. For example, the inventory list may include one or more images, which may be representative images and/or images from the video, a classification (e.g., name or type identifier) of the object, weight and/or size of the object, and/or a number of instances the object identified by the artificial intelligence engine 16 in the video. In some embodiments, the application 11 may enable the user to view an inventory list. The user may view the inventory list to confirm whether all of the objects and/or whether only the intended objects are identified by the artificial intelligence engine 16. In some embodiments, the application 11 may enable the user to adjust the identifications of objects in the inventory list through the application 11. For example, the indications of an identification of an object in the video may be an interactive element that may be modified by the user. The application 11 may enable the user to change the information of the inventory lists, such as a classification of an object (e.g., correcting the classification for a misclassified object), change a weight of an object (e.g., changing the weight of the object as assigned by the system 10 to a weight known by the user), and/or change a number of instances of the object (e.g., increasing the number to account of an object that is not identified, and/or decreasing the number to account for an object that is incorrectly identified and/or that the user does not want to include in the inventory). In some embodiments, some inventory information (e.g., space identifier, total number of items in a space, and/or weight of items in the space) may be displayed along with the inventory list. In some embodiments, the application 11 may enable the user to submit edits to the inventory, such as by editing the identifications of objects in the inventory list, to the system 10 for updating the inventory.

Figure 6:
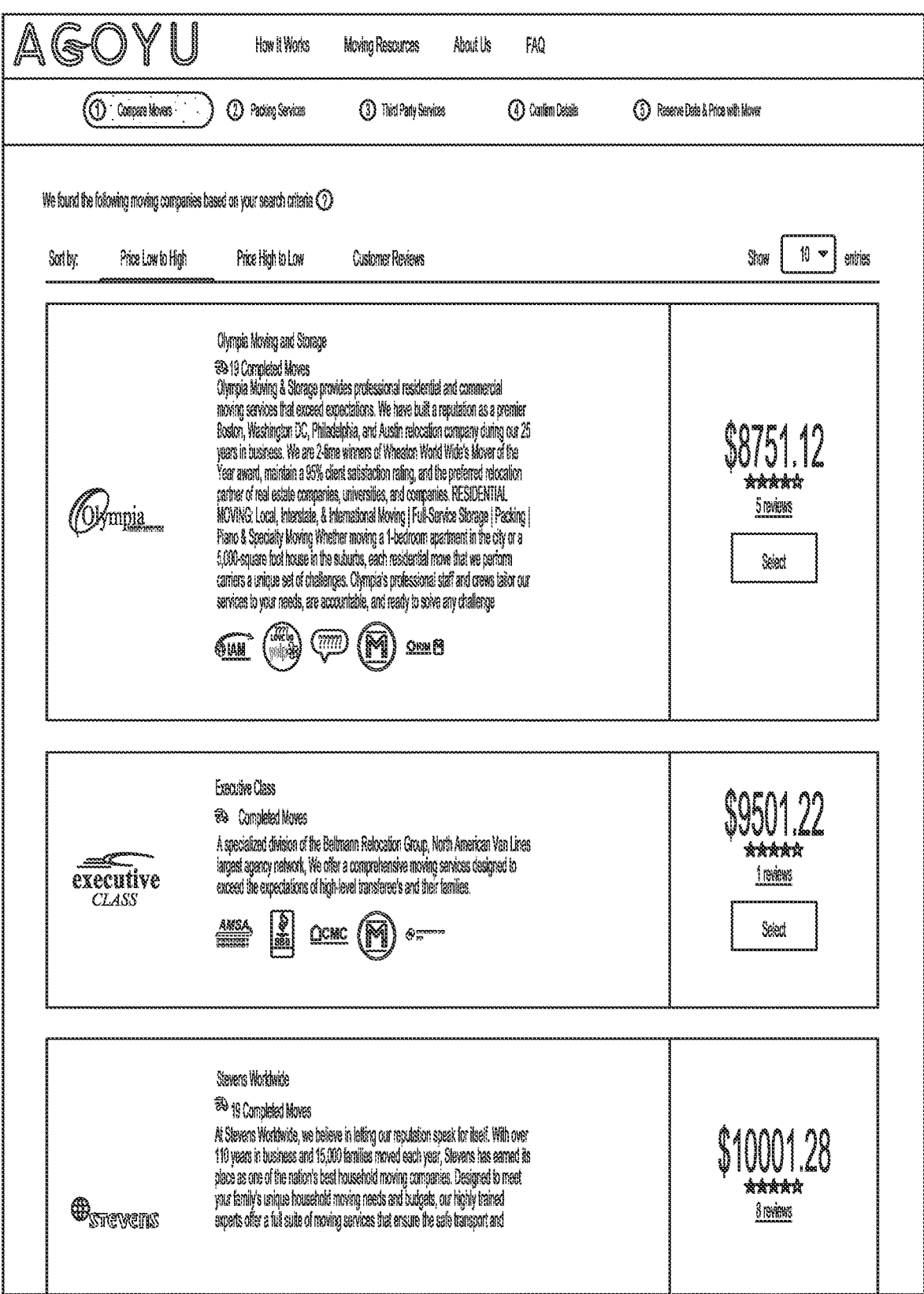

FIG. 6 illustrates an example of how the application 11 enables the consumer to review and/or select a service provider for moving the items of the inventory. As described herein, the system 10 may use the inventory generated by the artificial intelligence engine 16 and/or modified by the user through the application 11 to determine service providers capable and/or willing to move the items of the inventory. The system 10 may provide information for the service providers to the application 11. For example, the information for the service providers may include general information, such as an identification of the service provider (e.g., business name and/or logo), a description of a service provider, a rating of the service provider, a review of the service provider, a link to a consortium website (e.g., Better Business Bureau, Yelp, etc.) that may include information relating to the service provider, a certification of the service provider, an award to the service provider, a statistic relating to the service provider (e.g., number of completed moves), etc. For another example, the information for the service providers may include information as related to the move of the items of the inventory, such as a price for moving the items of the inventory. The application 11 may enable the user to review the information of the service providers and select a service provider with which to contract for moving the items of the inventory. This or similar examples be incorporated for implementation of block 132 described for the method 100 with reference to FIG. 1B, and blocks 216-218 described for the steps of method 200 with reference to FIG. 2.

Figure 7:
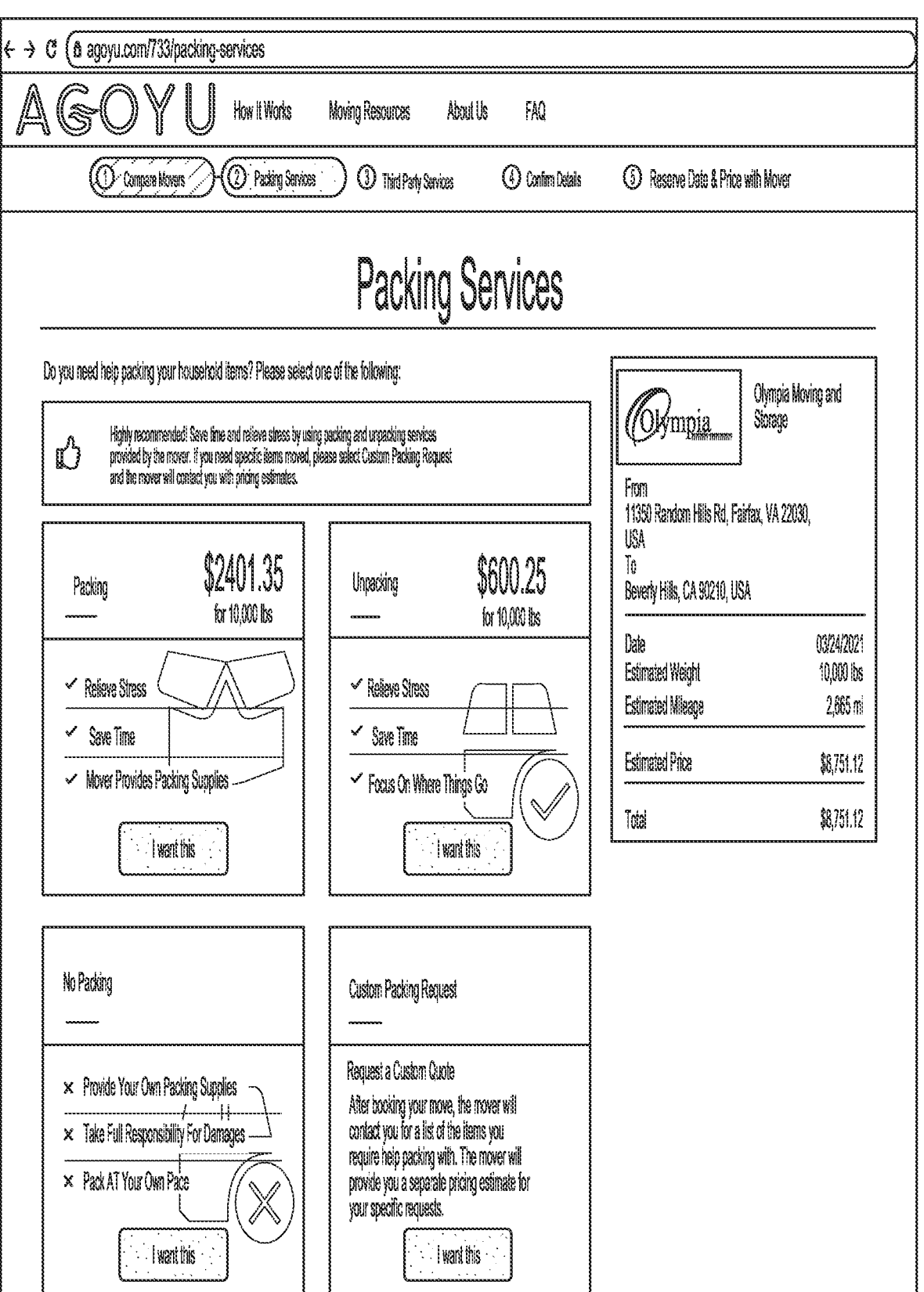

FIGS. 7 and 8 illustrate examples of how the application 11 enables the consumer to review and/or select additional services related to moving the items of the inventory. For example, the system 10 may identify services relating to moving the items of the inventory provided by the selected service provider and/or a third party. In some embodiments, the services may be standard services offered for any move, such as general packing service options (e.g., packing and/or unpacking service, opting out of packing and/or unpacking service, custom or partial packing and/or unpacking service, specialized packing and/or unpacking for specific items, etc.). In some embodiments, the services may be identified by the system 10, such as by the artificial intelligence engine 16, based on the items of the inventory, such as specialized packing for specific items in the inventory. Prices for such services may be calculated by the system 10 and provided to the user through the application 11. These or similar examples may be incorporated for implementation of block 132 described for the method 100 with reference to FIG. 1B, and blocks 216-218 described for the steps of method 200 with reference to FIG. 2.

Figure 9:
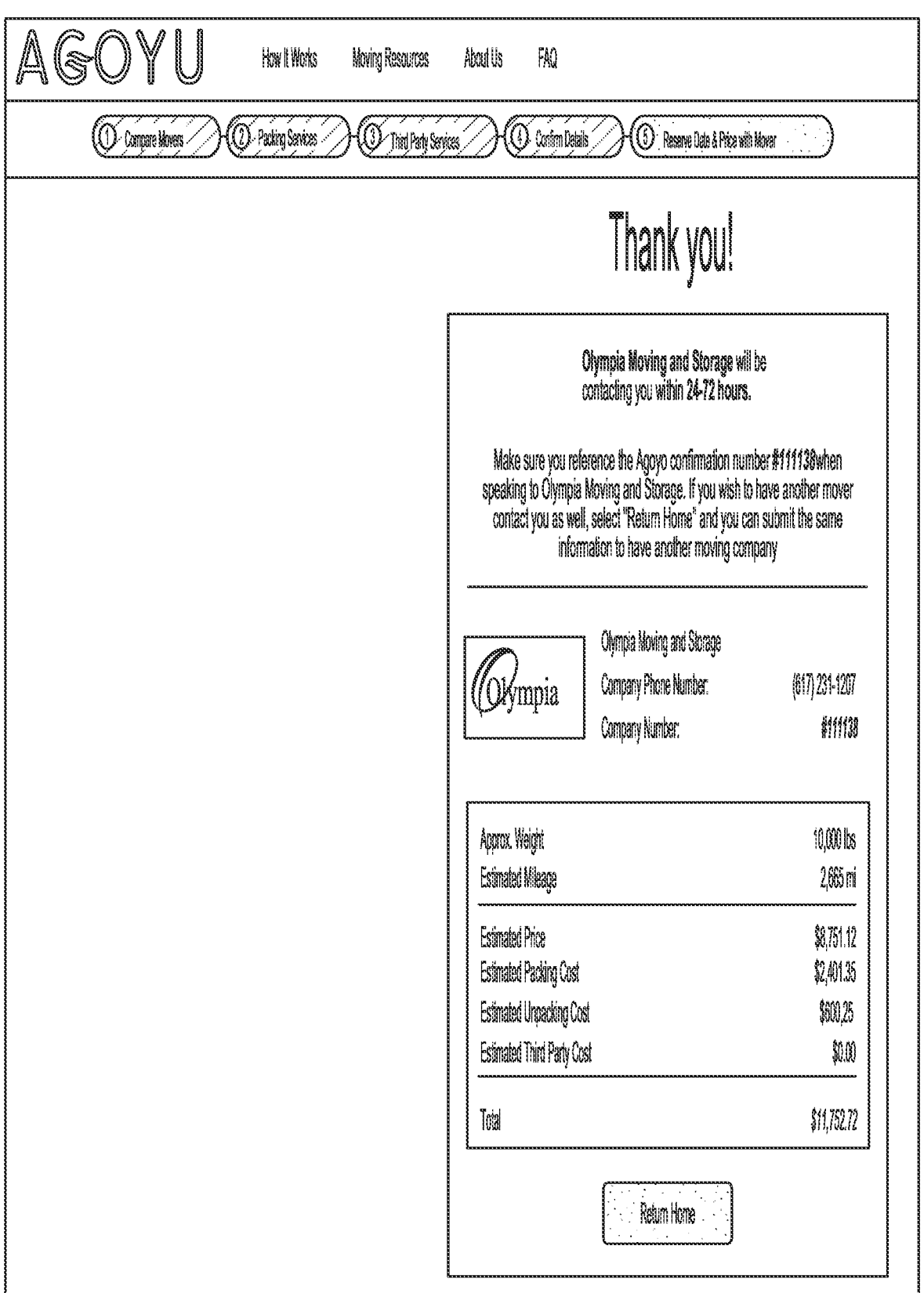

FIGS. 9 and 10, illustrate examples of how the application 11 enables the consumer to book services related to moving the inventory of items. The system 10 may provide the application 11 with information relating to booking service related to moving the inventory of items and the application 11 may present the information to the user. For example, the information the system may send to the application 11 and that the application 11 may present to the user may include, information for the selected service provider (e.g., an identifier, contact information, contact instructions, etc.), information relating to the move (e.g., weight and/or size of the inventory of items, distance of the move, start and/or end locations for the move, date of the service(s), etc.), prices for the service(s) (e.g., estimated and/or confirmed prices), etc. For example, FIG. 9 illustrates an example of information displayed of a confirmed estimate for services that may be used for booking the services with the service provider. For another example, FIG. 10 illustrates an example of information displayed of a booked service(s). These or similar examples may be incorporated for implementation of block 220 described for the steps of method 200 with reference to FIG. 2.

FIG. 11 is a process flow diagram illustrating operations of method 1100 for generating a moving cost estimate. With reference to FIGS. 1-11, in some embodiments, the steps of method 1100 may be implemented in one or more hardware processors 15, executing software (e.g., application 11) stored on a memory 13, and/or an artificial intelligence engine 16.

In block 1102, the one or more hardware processors 15 may receive data from the application 11 via an internet connection. The data may include data related to identifying objects to include in an inventory list for a move. For example, the data may include visual data, such as one or more digital videos and/or photographs, containing images of objects to include in the inventory list. For another example, the data may include text data configured to indicate information related to the objects to include in the inventory list, such as one or more of an object name or type identifier, an approximate or exact object weight, an approximate or exact object size, a name or type identifier of a space in which the object may belong, a number of instances of the object, a description of the object (e.g., fragile, antique, description of the condition of the object, such as any prior damage, etc.), etc. In some embodiments, multiple types of data may be formatted in manner in which different types of related data are associated with each other.

In block 1104, the one or more hardware processors 15 may provide the data received in block 1102 to the artificial intelligence engine 16 as input to one or more machine learning models. The hardware processors 15 may provide the visual data to the artificial intelligence engine 16. In some embodiments, the hardware processors 15 may provide the text data to the artificial intelligence engine 16. In some embodiments, multiple types of data may be provided in manner in which different types of related data are associated with each other.

In block 1106, the artificial intelligence engine 16 may classify objects from the data. The one or more machine learning models of the artificial intelligence engine 16 may be configured to identify objects from visual data and classify the identified objects. The objects may include any object in the visual data regardless of whether the object is an object typically of a type to be included in an inventory list for a move. For example, the one or more machine learning models may identify and classify furniture, decorative accessories, appliances, etc. that may be of a type typically included in an inventory list for a move. For example, the one or more machine learning models may identify and classify people, structural or permanent features of a space, objects outside of a space (e.g., through a window, including landscaping, objects on another property, vehicles, etc.), etc. that may be of a type typically not included in an inventory list for a move. In some embodiments, the one or more machine learning models may be configured to identify the objects additionally to and/or in conjunction with the visual data from the text data and classify the identified objects. In some embodiments, the artificial intelligence engine 16 may further include one or more machine learning models that may be configured to identify services, such as third party services, that may be recommended and/or required for a classified object. For example, the one or more machine learning models may identify that a classified object may be also classified as a delicate, high value, oversized, unconventionally shaped object, such as a grandfather clock, artwork, glass furniture, piano, etc., as recommend for and/or requiring special handling or "crating". In some embodiments, the one or more machine learning models may include machine learning models from AI Amazon Rekognition®, Google® Vision AI products, or any similar, commercially available product that may be accessed over the internet. The artificial intelligence engine 16 may generate a data set of objects classified from the data received from the one or more hardware processors 15 in block 1104 and provide the data set to the one or more hardware processors 15. In some embodiments, the data set may include each classified object individually. In some embodiments, the data set may include multiple instances of like classified objects indicated as a number of instances of a classified objects associated with the classified object. The artificial intelligence engine 16 may include in the data set and/or generate a separate data set of objects classified and associated with identified third party services.

In block 1108, the one or more hardware processors 15 may determine which object(s) to remove from the data set of objects received from the artificial intelligence engine 16. As described above, in some embodiments, the artificial intelligence engine 16 may include objects detected in the data that may be of a type typically not included in an inventory list for a move. The one or more hardware processors 15 may compare the data sets of objects to a data set of objects to include in an inventory and/or to exclude from the inventory. For example, comparing the data set of objects to the data set of objects to include in the inventory, the one or more hardware processors 15 may remove any objects that do not correspond with the data set of objects to include in the inventory. For another example, comparing the data set of objects to the data set of objects to exclude from the inventory, the one or more hardware processors 15 may remove any objects that do correspond with the data set of objects to exclude from the inventory. In block 1110, the one or more hardware processors 15 may remove the determined objects from the data set. The remaining objects in the data set may be an inventory of items for a move.

In block 1112, the one or more hardware processors 15 may determine weights for the objects of the inventory. For example, the one or more hardware processors 15 may compare the objects of the inventory to a data set of objects with weights, such as a statistically calculated representative weight of the classification of object (e.g., an average, a mean, etc.). The data set of objects with weights may include classifications of objects associated with the weights of the objects. The one or more hardware processors 15 may associate weights with objects in the inventory using the weights associated with corresponding objects of the data set of objects with weights. In block 1114, the one or more hardware processors 15 may calculate a total estimated weight of the objects of the inventory. The total estimated weight of the objects of the inventory may be an accumulation of the weights of all of the objects in the inventory.

In determination block 1116, the one or more hardware processors 15 may determine whether the move for the inventory of items is international. Part of the data provided to the one or more hardware processors 15 from the application 11, for example, in block 1102 and/or at different time, may include a starting or pickup address and an ending or dropoff address. The one or more hardware processors 15 may compare the addresses to determine whether the move for the inventory of items is international.

In response to determining that the move for the inventory of items is international (i.e., determination block 1116="Yes"), the one or more hardware processors 15 may determine a space measurement for international shipping in block 1118. For example, the one or more hardware processors 15 may compare the objects of the inventory to a data set of objects with sizes, such as a statistically calculated representative size of the classification of object (e.g., an average, a mean, etc.). The data set of objects with sizes may include classifications of objects associated with sizes of the objects. The one or more hardware processors 15 may associate sizes with objects in the inventory using the sizes associated with corresponding objects of the data set of objects with sizes. In block 1120, the one or more hardware processors 15 may calculate a total estimated size of the objects of the inventory. The total estimated size of the objects of the inventory may be an accumulation of the sizes of all of the objects in the inventory.

In response to determining that the move for the inventory of items is not international (i.e., determination block 1116="No"), or following calculating a total estimated size of the objects of the inventory in block 1120, the one or more hardware processors 15 may generate virtual survey of the objects of the inventory for the move. The virtual survey may include any combination of the objects of the inventory for the move, the weights of the classified objects, and/or the sizes of the classified objects. For example, the objects of the inventory may include a name or type identifier of a classified object, an image of a classified object, such as a generic representative image and/or an image extracted from the data used to classify the object, and/or a number of instances of a classified object. For example, the weights of the classified objects may include individual weights for each object, a representative weight for a single instance of multiple instances of an object, and/or the accumulated weight of a group of objects (e.g., multiple instances of an object, objects associated with a space, all of the objects of the inventory, etc.). The sizes of the classified objects may include individual sizes for each object, a representative size for a single instance of multiple instances of an object, and/or the accumulated size of a group of objects (e.g., multiple instances of an object, objects associated with a space, all of the objects of the inventory, etc.). In some embodiments, the virtual survey may include associations of the objects of the inventory for the move, the weights of the classified objects, and/or the sizes of the classified objects with a name or type identifier of a space in which the object may belong. The one or more hardware processors 15 may associate a data set received from the artificial intelligence engine 16 with the name or type identifier of the space associated with the data from which the data set was generated. In block 1124, the one or more hardware processors 15 may transmit the virtual survey to the application 11 via the internet connection.

FIG. 12 is a process flow diagram illustrating operations of method 1200 for generating a moving cost estimate. With reference to FIGS. 1-12, in some embodiments, the steps of method 1200 may be implemented in one or more hardware processors 15, executing software (e.g., application 11) stored on a memory 13, and/or an artificial intelligence engine 16.

In optional block 1202, the one or more hardware processors 15 may receive modified data of the virtual survey (e.g., transmitted as described for block 1124 of the steps of method 1100 with reference to FIG. 11) from the application 11 via the internet connection. The user of the application 11 may modify the virtual survey through the application 11 as described for block 212 of the steps of method 200 with reference to FIG. 2. For example, the modified data of the virtual survey may include corrected information in the virtual survey, added information to the virtual survey, and/or deleted information from the virtual survey as described further herein, for example, with reference to FIGS. 4A-5B. In some embodiments, the modified data of the virtual survey may include portions of the virtual survey with the modified data. In some embodiments, the modified data of the virtual survey may include the entire virtual survey having portions of the virtual survey with the modified data.

In optional block 1204, the one or more hardware processors 15 may update the virtual survey with the modified data of the virtual survey received in optional block 1202. For example, updating the virtual survey may include identifying portions of the virtual survey to update based on the received modified data, and replacing the portions of the virtual survey with the modified data. For another example, updating the virtual survey may include replacing an entire virtual survey with the entire virtual survey having portions of the virtual survey with the modified data. In some embodiments, updating the virtual survey may include recalculating weights and/or sizes of objects in the virtual survey. In some embodiments, such recalculations of the weights may be implemented in similar manners to determining weights for the objects of the inventory in block 1112 and calculating a total estimated weight of the objects of the inventory in block 1114. In some embodiments, such recalculations of the sizes may be implemented in similar manners to determining a space measurement for international shipping in block 1118 and calculating a total estimated size of the objects of the inventory in block 1120. In optional block 1206, the one or more hardware processors 15 may transmit the updated virtual survey to the application 11 via the internet connection.

In block 1208, the one or more hardware processors 15 may receive an acceptance of the (updated) virtual survey from the application 11 via the internet connection. The user of the application 11 may review and optionally confirm the (updated) virtual survey as described herein for block 212 of steps of method 200 with reference to FIG. 2. The confirmation by the user may trigger the application 11 to send an indication of confirmation, or acceptance, of the (updated) virtual survey to the one or more hardware processors 15.

In block 1210, the one or more hardware processors 15 may identify service provider(s) and/or service(s) based on data received from the application 11 and/or the virtual survey. Identifying service provider(s) and/or service(s) may be based on multiple factors. For example, such factors may include information from the virtual survey, such as weight, size, and/or contents of the inventory of objects for the move. For another example, such factors may include third party services identified by the artificial intelligence engine 16 and provided to the one or more hardware processors 15 as described herein for block 1104 of the steps of method 1100 with reference to FIG. 11. For another example, such factors may include information provided to the one or more hardware processors 15 in data received from the application 11, such as dates and locations for pick-up and delivery entered by a user of the application as described for block 214. The one or more hardware processors 15 may identify a service provider(s) and/or service(s) based on the factors that correspond with parameters for the service provider(s) and/or the service(s). For example, the one or more hardware processors 15 may access a database 14 having service provider(s) and/or service(s) associated with parameter values, such as threshold values for weight and/or size, service locations for rendering service, availability dates, etc., for various factors relating to the service provider(s) and/or service(s).

In block 1212, the one or more hardware processors 15 may calculate a cost estimate for a service(s) from a service provider(s), such as those identified in block 1210. Calculating a cost estimate for a service(s) from a service provider(s) may be based on multiple factors. For example, such factors may include information from the virtual survey, such as weight, size, and/or contents of the inventory of objects for the move. For another example, such factors may include third party services identified by the artificial intelligence engine 16 and provided to the one or more hardware processors 15 as described herein for block 1104 of the steps of method 1100 with reference to FIG. 11. For another example, such factors may include information provided to the one or more hardware processors 15 in data received from the application 11, such as dates and locations for pick-up and delivery entered by a user of the application as described for block 214. The one or more hardware processors 15 may calculate a cost estimate based on the factors that correspond with parameters for the service provider(s) and/or the service(s). For example, the one or more hardware processors 15 may access a database 14 having service provider(s) and/or service(s) associated with cost values and/or functions based on parameter values, such as threshold values for weight and/or size, service locations for rendering service, availability dates, etc., for various factors relating to the service provider(s) and/or service(s). For example, a service provider may be associated with a cost value until one or more parameters are reached, at which point the cost value may be different. In some embodiments, service providers may upload custom parameters to the database 14, such as various costs of services, threshold for different costs of a service (e.g., based on weight, size, dates, distance, etc.), availability dates, locations for rendering service, etc.

In some embodiments, the one or more hardware processors 15 may use a cost value and calculate a cost estimate using a predetermined formula. For example, a local move may be priced by the number of employees assigned, the hours worked, and the moving vehicle. The one or more hardware processors 15 may determine the number of employees needed, hours needed, and truck size based on the inventory list and estimated weight. These determinations may be based on past moves of similar size and inventory. The database 14 may include pricing based on employees, hours, and truck sizes for various service providers. The one or more hardware processors 15 may calculate a cost estimate for the local move based on the costs and determinations.

For another example, a move across state lines may include a rate tariff filed with the Department of Transportation. The tariff publishes the mover's costs associated with moving items, weights and services. The database 14 may include a standard rate tariff and/or a custom rate tariff for the service providers for interstate moves. The one or more hardware processors 15 may calculate a cost estimate for the interstate move based on the inventory list, weight, and tariff "base rate" and applicable discount and/or markup for the service provider.

For another example, a move within the same state (but further than a local move) an intrastate rate may be used. The database 14 may include a standard rate tariff and/or a custom rate tariff for the service providers for intrastate moves. Many states have their own tariff which may be required by state law to use. In such states, the database 14 may include state tariff. The one or more hardware processors 15 may calculate a cost estimate for the interstate move based on the inventory list, weight, and tariff "base rate" and applicable discount and/or markup for the service provider.

For another example, for an international move (e.g., outside of the continental US or from "country to country") service provider rates may be based on 1) an origin cost (packing loading), 2) a shipping cost (by sea or air), and 3) destination costs—delivery and unloading the goods. The database 14 may include a rate for the service provider, for example, on a country-to-country basis based on a base rate and applicable discount and/or markup. The one or more hardware processors 15 may calculate a cost estimate for the interstate move based on the inventory list, weight, and "base rate" and applicable discount and/or markup for the service provider.

If packing service is added the one or more hardware processors 15 may add the cost of the pack and unpack based on the inventory and weight. If third party services are added, the third party services may be similarly determined by the one or more hardware processors 15 based on a predetermined formula and the parameters for the third party services in the database 14.

In block 1214, the one or more hardware processors 15 may transmit the cost estimate(s) for the service(s) of the service provider(s), as calculated in block 1212, to the application 11 via the internet connection. In block 1216, the one or more hardware processors 15 may receive an acceptance of the service(s) of the service provider(s) from the application 11 via the internet connection. The user of the application 11 may review and optionally confirm the cost estimates of the service(s) of the service provider(s) as described herein for block 218 of steps of method 200 with reference to FIG. 2. The confirmation by the user may trigger the application 11 to send an indication of confirmation, or acceptance, of the service(s) of the service provider(s) to the one or more hardware processors 15.

In block 1218, the one or more hardware processors 15 may record a service(s) contract(s) on to a distributed ledger 20. The distributed ledger 20 may be configured to store data of the accepted service(s) of the service provider(s), including the virtual survey, service(s), costs, locations, dates, payment methods, terms, milestones, etc. in association with each other in a manner that is protected against change and/or keeps a record of all changes. For example, multiple copies of associated data may be stored across different computing device of the distributed ledger 20 and any changes to the stored data may require approval by a majority of the computing devices. Approval may be achieved by known means implemented for any type of distributed ledger 20. The distributed ledger 20 may also be configured to permit parties to the service(s) contract(s) to view the data. The distributed ledger 20 may also be configured to implement smart contracts that may trigger execution of payment for the service(s) of the service provider(s) upon completion of designated milestones noted in the data. For example, payment information may be provided from the distributed ledger 20 to a payment processing system in response to data indicating that a milestone of delivery of the inventory of items is complete.

Figure 13:
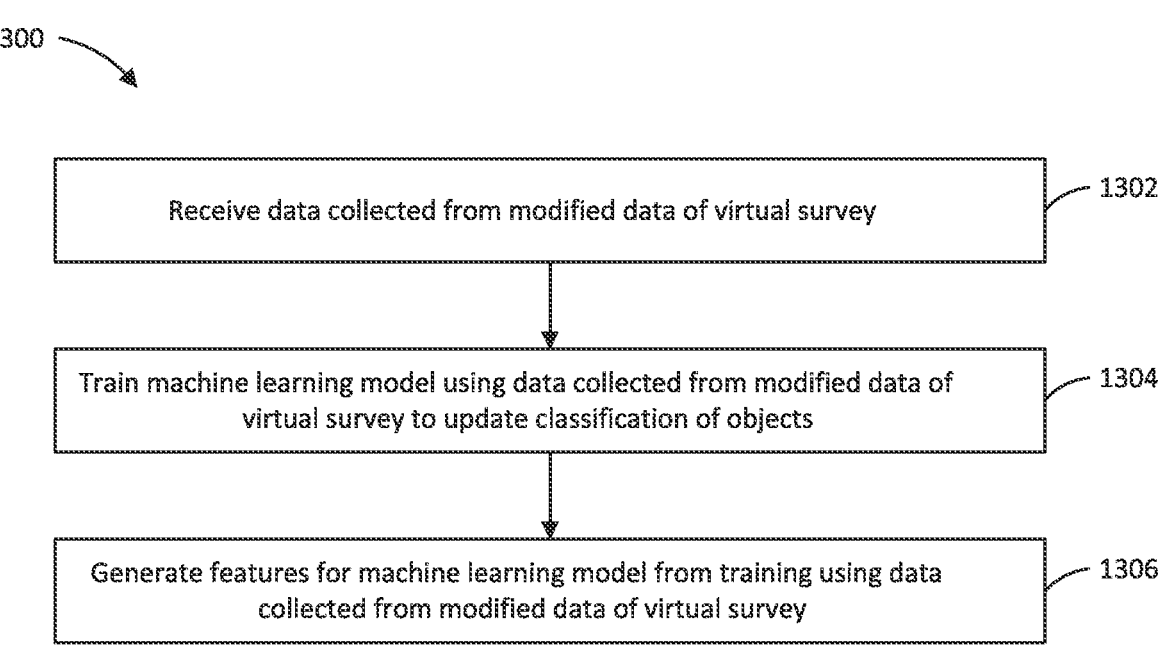
FIG. 13 is a process flow diagram illustrating an embodiment method for generating a moving cost estimate.

FIG. 13 is a process flow diagram illustrating operations of method 1300 to be followed in updating a system 10 for generating a moving cost estimate. With reference to FIGS. 1-13, in some embodiments, the steps of method 1300 may be implemented in one or more hardware processors 15, executing software (e.g., application 11) stored on a memory 13, and/or an artificial intelligence engine 16.

In block 1302, the artificial intelligence engine 16 may receive data collected from modified data of a virtual survey. For example, the one or more hardware processors 15 may provide the artificial intelligence engine 16 the modified data of the virtual survey received from the application 11 as described for optional block 1202 of the steps of method 1200 with reference to FIG. 12. The modified data of the virtual survey may represent data that may correct errors in object classification by the one or more machine learning models of the artificial intelligence engine 16 and/or illustrate tendencies of users from which the one or more machine learning models may be trained to provide object classifications that may result in fewer modifications of the virtual survey by the user.

In block 1304, the artificial intelligence engine 16 may train the weights of the one or more machine learning models using the data collected from the modified data of the virtual surveys to update classifications of objects. In some embodiments, the training may correct and/or refine object classification from the data received data received from the application 11 by the one or more hardware processors 15 and provided to the artificial intelligence engine 16 as described for blocks 1102, 1104 of the steps of method 1100 with reference to FIG. 11. For example, the training may correct and/or refine object classification such as name and/or type identifier of objects. Training may be accomplished by various known means of machine learning model training, including various manners of supervised learning, unsupervised learning, dimensionality reduction, etc. In block 1306, the artificial intelligence engine 16 may generate and store features, or weights, for the one or more machine learning models from training using the data collected from the modified data of the virtual surveys to update classifications of objects.

Figure 14:
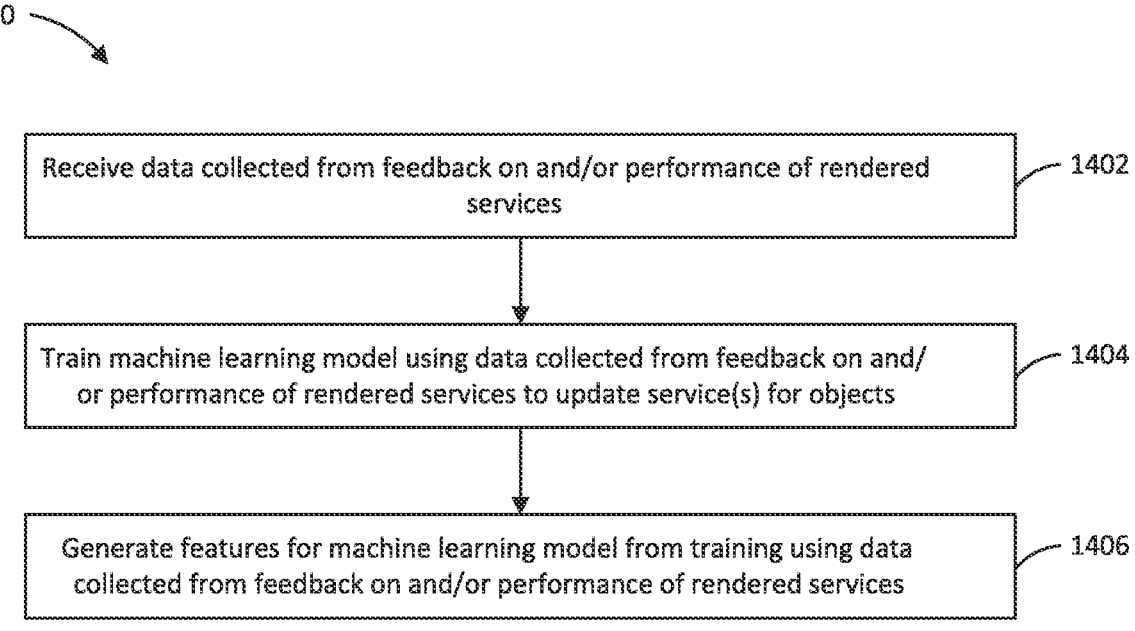

FIG. 14 is a process flow diagram illustrating operations of method 1400 to be followed in updating a system 10 for generating a moving cost estimate. With reference to FIGS. 1-14, in some embodiments, the steps of method 1400 may be implemented in one or more hardware processors 15, executing software (e.g., application 11) stored on a memory 13, and/or an artificial intelligence engine 16.

In block 1402, the artificial intelligence engine 16 may receive data collected from feedback on and/or performance of rendered services. For example, a user may provide feedback on a rendered service, such as comments, ratings, damage claims, etc. through the application 11, which may be provided to the one or more hardware processors 15, and, in turn, provide to the artificial intelligence engine 16. For another example, the system 10 may track data on performance of rendered services, such as estimated to actual shipment weight by service provider variance, average costs of similar shipments, estimated cost to actual cost variance, claims for damages, which items were damaged, estimated delivery date and actual delivery date, etc. The feedback and performance data on a rendered service may represent data that may indicate errors in (e.g., lack of) identification of services by the one or more machine learning models of the artificial intelligence engine 16, illustrate tendencies of users from which the one or more machine learning models may be trained to more provide services that may result in greater satisfaction by the user customer, illustrate common and/or specific issues with aspects of a service that may be noted to a user to help improve satisfaction, etc.

In block 1404, the artificial intelligence engine 16 may train the weights of the one or more machine learning models using the data collected from the data collected from the feedback on and/or performance of rendered services. In some embodiments, the training may correct and/or refine service suggestions for classified objects as described for block 1210 of the steps of method 1200 with reference to FIG. 12. For example, the training may correct and/or refine service suggestions for certain object classifications associated with reduced damage to the classified objects, and/or greater ratings and/or more positive reviews. For example, the training may refine service suggestions associated with more accurate cost estimates, more accurate service timelines, more accurate weight estimations, etc. Training may be accomplished by various known means of machine learning model training, including various manners of supervised learning, unsupervised learning, dimensionality reduction, etc.

In block 1406, the artificial intelligence engine 16 may generate and store features, or weights, for the one or more machine learning models from training using the data collected from the feedback on and/or performance of rendered services.

The various embodiment methods may also be performed partially or completely on a variety of computing devices, such as a server. Such embodiments may be implemented on any of a variety of commercially available server devices, such as the server 1500 illustrated in FIG. 15. Such a server 1500 typically includes a processor 1501 coupled to internal memory 1502 (e.g., volatile memory) and a large capacity nonvolatile memory 1503, such as a disk drive. The server 1500 may also include a floppy disc drive, compact disc (CD) or DVD disc drive 1504 coupled to the processor 1501. The server 1500 may also include network access ports 1505 coupled to the processor 1501 for establishing data connections with a network 1506, such as a local area network coupled to other broadcast system computers and servers. The processor 1501 may be any programmable microprocessor, microcomputer or multiple processor chip or chips that may be configured by software instructions (applications) to perform a variety of functions, including the functions of the various embodiments described above. Typically, software applications may be stored in the memory 1502, 1503 before they are accessed and loaded into the processor 1501. The processor 1501 may include internal memory sufficient to store the application software instructions.

The various embodiments described above may also be implemented within a variety of computing devices, such as a laptop computer 1600 illustrated in FIG. 16. Many laptop computers include a touchpad 1617 with touch surface that serves as the computer's pointing device, and thus may receive drag, scroll, and flick gestures similar to those implemented on mobile computing devices equipped with a touch screen display and described above. A laptop computer 1600 will typically include a processor 1611 coupled to volatile memory 1612 and a large capacity nonvolatile memory, such as a disk drive 1613 of Flash memory. Additionally, the laptop computer 1600 may have one or more antennas 1608 for sending and receiving electromagnetic radiation that may be connected to a wireless data link and/or cellular telephone transceiver 1616 coupled to the processor 1611. The laptop computer 1600 may also include a floppy disc drive 1614 and a compact disc (CD) drive 1615 coupled to the processor 1611. In a notebook configuration, the computer housing includes the touchpad 1617, the keyboard 1618, and the display 1619 all coupled to the processor 1611. Other configurations of the mobile computing device may include a computer mouse or trackball coupled to the processor (e.g., via a USB input) as are well known, which may also be used in conjunction with the various embodiments.

FIG. 17 is a component block diagram of a computing device 1700 suitable for use with various embodiments. Various embodiments may be implemented on a variety of computing devices 1700, an example of which is illustrated in FIG. 17 in the form of a smartphone. The computing device 1700 may include a first processor 1702 (e.g., a CPU) coupled to a second processor 1704 (e.g., a GPU). The first and second processors 1702, 1705 may be coupled to internal memory 1706, 1716, a display panel 1771, and to a speaker 1714. Additionally, the computing device 1700 may include an antenna 1704 for sending and receiving electromagnetic radiation that may be connected to a wireless data link and/or cellular telephone transceiver 1766 coupled to one or more processors 1702, 1704. The computing device 1700 may also include menu selection buttons or rocker switches 1720 for receiving user inputs.

The computing device 1700 also includes a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors 1702, 1704, wireless transceiver 1766 and CODEC 1710 may include a digital signal processor (DSP) circuit (not shown separately).

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computing system, comprising:
a memory storing a plurality of instructions and data;
one or more hardware processors configured to access the memory, wherein the one or more hardware processors are further configured to:
    receive an access request from a mobile user application of a mobile device;
    receive video data that includes scans of each room to be surveyed;
    input the received video data into an artificial intelligence engine, wherein the artificial intelligence engine is trained using reinforcement-type machine learning based upon data comprising video and text that includes estimated room dimensions, wherein the artificial intelligence engine is trained to identify objects of the received video data by type and to estimate dimensions of the objects and rooms;
    compare identified objects of the received video data to an exclusionary data set, wherein the exclusionary data set comprises at least one of persons, permanent features of a space, vehicles, and objects outside of a space;
    automatically omit any identified object of the received video data that corresponds to the exclusionary data set;
    compile an inventory via executing the artificial intelligence engine, wherein the inventory comprises a list of items to be moved, a type classification for each listed item, estimated dimensions of each listed item, and a specific room association for each listed item;
    obtain weight information on each listed item by accessing a database in the memory;
    compute a total moving weight based on the weight information on each listed item;
    determine, via executing the artificial intelligence engine, whether each listed item is of identified by type;
    generate a virtual survey that includes the inventory, the total moving weight, and an interactive video including one or more markers indicating an object corresponding to an item listed in the inventory in response to determining that each listed item is identified by type;
    update the virtual survey in response to receiving user input modifying the one or more markers in the interactive video;
    receive dates and locations for pick-up and delivery of the items included in the virtual survey;
    determine service providers that are available to move the items included in the virtual survey from the received pick-up location to the received delivery location at the received dates;
    determine blackout dates and discounts for each of the determined available service providers;
    automatically generate estimates for each of the determined available service providers based at least in part on the blackout dates and discounts, wherein the generated estimates include:
        estimates for moving costs at different moving times; and
        estimates for secondary services, wherein the secondary services include packing, unpacking, junk removal, and storage;
    receive user input selecting one of the determined available service providers;
    directly book the selected service provider for a move; and
    document the booked move in a distributed ledger system, wherein the distributed ledger system is implemented across multiple computing devices, and wherein changes to data associated with the booked move require approval from a majority of the multiple computing devices.

2. The computing system of claim 1, wherein:
the one or more hardware processors are further configured to compile the inventory by:
    receiving at least one of text identifying room dimensions of one or more of the surveyed rooms, and video identifying an object with known dimensions that is included in one or more of the surveyed rooms, and
    identifying the items included in the video data by inputting the text identifying the room dimensions or the video identifying the object with known dimensions into the artificial intelligence engine.

3. The computing system of claim 2, further comprising using the text identifying the room dimensions or the video identifying the object with known dimensions to calculate the estimated dimensions of each listed item.

4. The computing system of claim 2, wherein the one or more hardware processors are configured to receive the video data that includes the scans of each room to be surveyed by receiving video data that includes views from at least two angles for:

each surveyed room; and each of the items included in the list of items to be moved.

5. The computing system of claim 2, wherein the one or more hardware processors are further configured to render rating information for each of the determined available service providers prior to receiving the user input selecting one of the determined available service providers.

6. The computing system of claim 1, wherein the one or more hardware processors are further configured to determine moving variables for one or more of inventory, weight, or size.

7. The computing system of claim 6, wherein the one or more hardware processors are configured to determine the moving variables for the inventory, weight, or size based on:

user input;

estimates generated based on inventory information included in the user input;

estimates generated based on a box count, or estimates generated by the artificial intelligence engine based at least in part on images taken by the mobile device.

8. The computing system of claim 1, wherein the one or more hardware processors are further configured to determine move parameters that include one or more of:

an origin move parameter, a destination move parameter, or a shipment date move parameter.

9. The computing system of claim 1, wherein the one or more hardware processors are configured to automatically generate the estimates for each of the determined available service providers further based on whether the move from an origin to a destination is:

a local move, an interstate move, an intrastate move, or an international move.

10. The computing system of claim 1, wherein the one or more hardware processors are further configured to:

update the generated estimates, determined blackout dates, or determined discounts based on user input.

11. The computing system of claim 1, wherein the one or more hardware processors are further configured to determine additional services to be provided at least in part by an artificial intelligence engine based on move parameters or move variables.

12. The computing system of claim 1, wherein the one or more hardware processors are further configured to provide an option to the determined available service providers to provide a discount or final price in a reverse marketplace.

13. The computing system of claim 1, wherein the selected estimate is a guaranteed and/or not to exceed quote.

14. The computing system of claim 1, wherein the one or more hardware processors are further configured to provide a consumer follow-up automatically after booking the move.

15. The computing system of claim 1, wherein the one or more hardware processors are further configured to provide analytics on the move.

16. The computing system of claim 1, wherein the one or more hardware processors are further configured to:

display a prompt for reanalysis of the list of items to be moved in response to determining that at least one of the listed items is not identified by type, wherein the reanalysis includes recording additional video data.

17. The computing system of claim 1, wherein the one or more hardware processors are further configured to:

receive modified data of the virtual survey from the mobile user application via an internet connection; and train weights of one or more machine learning models of the artificial intelligence engine based on the modified data of the virtual survey to update classifications of objects.

* * * * *